United States Patent
Lim et al.

(10) Patent No.: US 11,757,523 B2
(45) Date of Patent: Sep. 12, 2023

(54) AERIALLY DISTRIBUTABLE COMMUNICATIONS DEVICE

(71) Applicant: WISE NETWORKING PTY LTD, Ultimo (AU)

(72) Inventors: Yen Yang Lim, Ultimo (AU); Alexander Domineyk Benoit Le Poer Trench, Stanmore (AU); Gavan Huang, North Rocks (AU)

(73) Assignee: WISE NETWORKING PTY LTD, Ultimo (AT)

( * ) Notice: Subject to any disclaimer, the term of this patent is extended or adjusted under 35 U.S.C. 154(b) by 0 days.

(21) Appl. No.: 17/764,085

(22) PCT Filed: Sep. 28, 2020

(86) PCT No.: PCT/AU2020/051032
§ 371 (c)(1),
(2) Date: Mar. 25, 2022

(87) PCT Pub. No.: WO2021/056080
PCT Pub. Date: Apr. 1, 2021

(65) Prior Publication Data
US 2022/0345204 A1     Oct. 27, 2022

(30) Foreign Application Priority Data
Sep. 27, 2019   (AU) ................................ 2019903642

(51) Int. Cl.
| | | |
|---|---|---|
| *H04B 7/185* | (2006.01) | |
| *B64C 11/04* | (2006.01) | |
| *B64C 11/30* | (2006.01) | |
| *B64C 27/02* | (2006.01) | |
| *B64D 1/02* | (2006.01) | |

(Continued)

(52) U.S. Cl.
CPC .......... *H04B 7/18504* (2013.01); *B64C 11/04* (2013.01); *B64C 11/30* (2013.01);
(Continued)

(58) Field of Classification Search
CPC . H04B 7/18504; H04B 7/18502; B64C 11/04; B64C 11/30; B64C 27/02;
(Continued)

(56) References Cited

U.S. PATENT DOCUMENTS

| | | |
|---|---|---|
| 8,210,465 B2 | 7/2012 | Merems et al. |
| 9,573,684 B2 | 2/2017 | Kimchi et al. |

(Continued)

FOREIGN PATENT DOCUMENTS

| | | |
|---|---|---|
| DE | 102008058000 A1 | 5/2010 |
| WO | 2016/134193 A1 | 8/2016 |

OTHER PUBLICATIONS

Authorized Officer: Ashwin Edakandi, International Search Report and Written Opinion issued in PCT application No. PCT/AU2020/051032, dated Nov. 26, 2020, 9 pp.

(Continued)

*Primary Examiner* — Fred A Casca
(74) *Attorney, Agent, or Firm* — KAPLAN BREYER SCHWARZ, LLP

(57) ABSTRACT

The present invention relates to an aerially distributable communications device (ACCD) including one or more gyrochutes and communications module configured for wireless communication with external communication nodes. The communications module can be configured for mesh network type communication with similar aerially distributable communications device, or as a gateway type communications device to a wide area network such as a satellite network. The ACCD is for deployment in remote areas and/or areas where normal communications networks are down, such as disaster areas. The ACCD can be deployed from an aircraft or a spacecraft. The ACCD can further be configured with emergency equipment such as water purification equipment, power charging equipment, or the like.

19 Claims, 30 Drawing Sheets

(51) Int. Cl.
*B64C 39/02* (2023.01)
*B64U 101/20* (2023.01)

(52) U.S. Cl.
CPC .............. *B64C 27/02* (2013.01); *B64D 1/02* (2013.01); *B64C 39/024* (2013.01); *B64U 2101/20* (2023.01)

(58) Field of Classification Search
CPC ..... B64C 39/024; B64C 11/001; B64C 11/28; B64C 11/44; B64D 1/02; B64D 1/14; B64D 19/02; B64D 1/12; B64U 2101/20; H04W 84/18; H04W 84/12; H04W 88/04; H04W 84/06
See application file for complete search history.

(56) References Cited

U.S. PATENT DOCUMENTS

| | | | |
|---|---|---|---|
| 10,407,167 B1* | 9/2019 | Beckman | B64C 39/064 |
| 2014/0204801 A1 | 7/2014 | Bordetsky et al. | |
| 2016/0059960 A1* | 3/2016 | Fearn | B64C 27/06 244/17.11 |
| 2019/0329903 A1* | 10/2019 | Thompson | G06V 20/13 |
| 2020/0062383 A1* | 2/2020 | Kim | B64U 30/20 |
| 2020/0070977 A1* | 3/2020 | Kang | F42B 15/105 |

OTHER PUBLICATIONS

Authorized Officer: Rifat Shahriar, International Preliminary Report on Patentability issued in PCT application No. PCT/AU2020/051032, dated Sep. 17, 2021, 11 pp.

Authorized Officer: Ashwin Edakandi, Search Report issued in Australian patent application No. 2019903642, dated Feb. 18, 2020, 21 pp.

Carlos Cambra Baseca et al., "Communication Ad Hoc Protocol for Inelligent Video Sensing using AR Drones", Conference: Proceedings of the 2013 IEEE 9th International Conference on Mobile Ad-hoc and Sensor Networks, Dec. 2013, DOI:10.1109/MSN.2013.115, 6 pp.

* cited by examiner

AERIALLY DISTRIBUTABLE COMMUNICATIONS DEVICE

FIELD OF THE INVENTION

The present invention relates to an aerially distributable communications device and in particular to an aerially distributable communications device for setting up a communications network in remote areas or areas where power and/or communications have been disabled.

The invention has been developed primarily for use in/with disaster management and will be described hereinafter with reference to this application. However, it will be appreciated that the invention is not limited to this particular field of use, and may be applied to use in a wide variety of applications, especially in remote areas.

BACKGROUND OF THE INVENTION

At present, when and natural disaster occurs, infrastructure, and especially communications infrastructure can be disrupted. This may be due to disruptions in electrical supply to communications networks, or because of physical destruction of the communications hardware.

Recovery and management efforts may be disrupted by lack of a reliable communication infrastructure. People that are in strife due to the natural disaster also find it difficult to communicate their situation to the authorities that can help them.

Gyrochutes, also known as rotary chutes and/or unpowered autogyros, are known, and are unpowered vehicles that include one or more sets of blades that operate to generate autorotation of the gyrochute. Autorotation of the gyrochute creates lift from the movement of air over the aerofoil blades. Further, the blades generate drag acting upwardly in a vertical direction as the gyrochute falls through the air. The vertical forces acting on the gyrochute to cause it to fall slower are typically generated by a combination of airflow over the blades from rotation about a central axis to create lift, as well as from vertical airflow as the gyrochute drops downwardly through the air, creating drag.

The present invention seeks to provide an aerially distributable communications device, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect, the present invention may be said to consist in an aerially distributable communications device for aerial deployment as a node of a communications network, the aerially distributed communications module including:
  a. a gyrochute including at least one or more set of blades, wherein the at least one or more set of blades includes an autorotation portion that is configured for inducing autorotation of the gyrochute; and
  b. a communications module configured for wireless communication with external communication nodes.

In one embodiment, the at least one or more set of blades are configured to induce autorotation and lift forces when falling through the air.

In one embodiment, the gyrochute includes a body.

In one embodiment, the body includes a hub.

In one embodiment, the body includes a hollow formation.

In one embodiment, the hollow formation is connected to the hub.

In one embodiment, the at least one or more set of blades are configured to generate vertical friction or drag forces when falling through the air.

In one embodiment, the at least one or more set of blades are configured to generate vertical forces when falling through the air from drag or air friction moving vertically over the gyrochute.

In one embodiment, the at least one or more set of blades are configured to generate vertical forces when falling through the air from lift generated from airflow moving over the at least one or more set of blades.

In one embodiment, the blades of the set of blades at least partly define an aerofoil shape along their length.

In one embodiment, the autorotation portion is configured to generate lift as the gyrochute is falling downwardly through the air, and wherein the lift includes at least a component for generating a rotational moment in the gyrochute.

In one embodiment, the pitch of the aerofoil shape is variable along the length of the blade.

In one embodiment, the pitch of the autorotation portion is configured with an angle of attack below the horizontal.

In one embodiment, the pitch of the autorotation portion is configured with an angle of attack below the horizontal when the gyrochute is in equilibrium falling through the air.

In one embodiment, the gyrochute includes a plurality of blades.

In one embodiment, the gyrochute includes three blades.

In one embodiment, the blades are connected to each other at a hub.

In one embodiment, the at least one or more set of blades are rigidly connected to the hub.

In one embodiment, the at least one or more set of blades are rotationally connected to the hub to freely rotate about the hub.

In one embodiment, the communications module is at least partly located in the hub.

In one embodiment, the gyrochute includes a hollow formation.

In one embodiment, the hollow formation is symmetrical.

In one embodiment, the hollow formation is one or more selected from:
  a. a cylindrical formation;
  b. an equilateral triangle formation;
  c. a square formation;
  d. a hexagon formation; and
  e. a polygonal formation.

In one embodiment, the hollow formation is segmented.

In one embodiment, at least one or more blade is connected to a segment of the hollow formation.

In one embodiment, a blade is associated with each segment of the hollow formation.

In one embodiment, at least one or more blades is associated with a vertical fin.

In one embodiment, a plurality of vertical fins together make up a segmented hollow formation.

In one embodiment, at least one or more of the vertical fins are aerofoil shaped in cross-section.

In one embodiment, the aerofoil shape of the at least one or more vertical fins is configured to be streamlined in the horizontal direction in use.

In one embodiment, the aerofoil shape of the at least one or more vertical fins is configured to be streamlined in the vertical direction in use.

In one embodiment, the hollow formation includes curved vertices.

In one embodiment, at least one of the blades is rigidly connected to the cylindrical formation.

In one embodiment, all of the blades are rigidly connected to a cylindrical formation.

In one embodiment, the cylindrical formation is configured for guiding airflow through the cylindrical formation as a main column of airflow.

In one embodiment, the communications module is at least partly located in the cylindrical formation.

In one embodiment, the gyrochute includes an annular flange.

In one embodiment, the annular flange extends outwardly from the hollow formation.

In one embodiment, the communications module is at least partly located in the hub.

In one embodiment, the annular flange extends outwardly from the cylindrical formation.

In one embodiment, the annular flange extends outwardly from an upper edge of the cylindrical formation.

In one embodiment, the annular flange includes a curved upper surface.

In one embodiment, the annular flange is aerofoil shaped.

In one embodiment, the curved upper surface is aerofoil shaped.

In an alternative embodiment, the annular flange includes a flat upper surface.

In one embodiment, the upper surface of the annular flange defines an inner edge and an outer edge.

In one embodiment, the inner edge of the upper surface of the annular flange extends further downwardly than the outer edge.

In one embodiment, the annular flange includes a curved lower surface.

In an alternative embodiment, the annular flange includes a flat lower surface.

In one embodiment, the flat lower surface intersects the outer vertical surface at an angle.

In one embodiment, the lower surface of the annular flange includes an outer edge.

In one embodiment, the lower surface of the annular flange includes an inner edge.

In one embodiment, the lower surface of the annular flange extends tangentially to the outer surface of the cylindrical formation.

In one embodiment, the lower surface of the annular flange curves outwardly and away from the outer surface of the cylindrical formation.

In one embodiment, the flat upper surface of the annular flange extends at an obtuse angle to the inner surface of the cylindrical formation when viewed in a radial plane.

In one embodiment, the curved upper surface of the annular flange is configured for inducing the main column of airflow to flow radially outwardly over the curved upper surface in use.

In one embodiment, the gyrochute includes at least one or more control surfaces.

In one embodiment, the annular flange includes at least one or more movable control surfaces.

In one embodiment the control surfaces include flange control surfaces configured to be movable for reconfiguring the position of the annular flange.

In one embodiment, the at least one or more movable flange control surfaces on the annular flange is rotatable about an upper edge of the hollow formation.

In one embodiment, the annular flange is pivotally movable relative to the hollow formation.

In one embodiment, the annular flange is segmented.

In one embodiment, each segment of the annular flange is associated with a segment of the hollow formation.

In one embodiment, the annular flange includes a pivoting arrangement.

In one embodiment, the pivoting arrangement is one or more selected from:
a. a hinge;
b. a flap; and
c. any other suitable pivoting arrangement.

In one embodiment, one or more sets of blades include at least one or more movable blade control surfaces.

In one embodiment, the at least one or more control surfaces include at least one or more control motors.

In one embodiment, the control motors are controllable by a controller.

In one embodiment, the control motors are controllable wirelessly from a remote controller.

In one embodiment, the aerially distributable communications device includes at least one or more legs extending underneath the communication module.

In one embodiment, the legs are resilient.

In one embodiment, the legs are composed of spring steel.

In one embodiment, the legs extend from the cylindrical formation.

In one embodiment, the communications module includes a controller.

In one embodiment, the gyrochute includes at least one or more aerofoil blades.

In one embodiment, the gyrochute includes a single set of blades.

In one embodiment, at least one or more of the blades includes an autorotation inducing portion.

In one embodiment, the autorotation inducing portion is an aerofoil portion.

In one embodiment, the gyrochute includes an extended trailing edge portion.

In one embodiment, at least one or more of the blades includes an aerofoil portion and an extended trailing edge.

In one embodiment, the extended trailing edge is substantially planar.

In one embodiment, the trailing edge extends substantially parallel with an upper edge of the cylindrical formation.

In one embodiment, the pitch of the aerofoil portion is below the horizontal.

In one embodiment, the pitch of the aerofoil portion is below the horizontal when the aerially distributable communications device is falling in equilibrium.

In one embodiment, the pitch of the aerofoil portion is variable.

In one embodiment, the pitch of the aerofoil portion can be controlled by the controller.

In one embodiment, the pitch of the aerofoil portion is between 0° and 90° in use with respect to the horizontal when the aerially distributable communications device is falling in equilibrium.

In one embodiment, the pitch of the aerofoil portion varies between 0° and 90° below the horizontal along its length.

In one embodiment, the trailing edge extends substantially horizontally in use when the aerially distributable communications device is falling in equilibrium and/or stable flight.

In one embodiment, the gyrochute includes at least a plurality of blade sets.

In one embodiment, the gyrochute includes a first blade set comprising a plurality of primarily lift force inducing blades attached at a hub.

In one embodiment, the plurality of lift force inducing blades extend radially from the hub.

In one embodiment, the lift force inducing blades are configured to present a constant pitch in use when the gyrochute is in equilibrium and/or stable flight.

In one embodiment, the lift force inducing blades include a pitch that is substantially horizontal.

In one embodiment, the lift force inducing blades are configured to present a pitch of between 0° and 90° downwardly from the horizontal.

In one embodiment, the first blade set is rigidly connected to a central axis.

In one embodiment, the first blade set is rigidly connected to the hollow formation.

In one embodiment, the first blade set and the hollow formation are concentric.

In one embodiment, the gyrochute includes a second blade set of primarily rotation force inducing blades.

In one embodiment, the rotation inducing blades are configured to present a pitch of between 0° and 90° downwardly from the horizontal.

In one embodiment, the rotation inducing blades are configured to vary their pitch along their length.

In one embodiment, the rotation inducing blades are configured to vary their pitch along the length to present a pitch of between 0° and 90° downwardly from the horizontal.

In one embodiment, the plurality of rotation inducing blades are attached at a hub.

In one embodiment, the plurality of rotation inducing blades extend radially from the hub.

In one embodiment, the second blade set is fixed in position relative to the cylindrical formation.

In one embodiment, the first blade set and the second blade set are concentric.

In one embodiment, the second blade set and the cylindrical formation are concentric.

In an alternative embodiment, the gyrochute includes a plurality of counter rotating blade sets.

In one embodiment, at least one or more of the plurality of counter rotating blade sets are freely rotatable about a central axis.

In one embodiment, at least one or more of the plurality of counter rotating blade sets includes primarily lift force inducing blades.

In one embodiment, at least one or more blades of the at least one or more blade sets are foldable blades.

In one embodiment, the foldable blades include a plurality of folding blade portions and a folding mechanism.

In one embodiment, the folding mechanism is spring-loaded.

In one embodiment, the blades are configured to be removable from the body.

In one embodiment, the blades are configured to be removably connectable to the body by a connector arrangement.

In one embodiment, the blades include connector formations for removable connection to the body.

In one embodiment, the connector arrangement includes one or more selected from:
   a. a spigot and socket arrangement;
   b. a bayonet fitting arrangement;
   c. a snap fit arrangement; and/or
      i. any other suitable connector arrangement.

Communications Module

In one embodiment, the communications module is configured for wireless communication in one or more selected from:
   a. a mesh topology network;
   b. a point-to-point network;
   c. a point to multipoint network;
   d. a star topology network; and
   e. any other suitable topology network.

In one embodiment, the communications module includes at least one or more antennaes.

In one embodiment, the controller includes at least one or more selected from:
   a. digital storage media for storing data and software instructions; and
   b. a processor configured for been directed by software instructions.

In one embodiment, the digital storage media is configured with software instructions for directing operation of the processor.

In one embodiment, the communications module includes at least one receiver.

In one embodiment, the communications module includes at least one transmitter.

In one embodiment, the communications module includes at least one or more sensors.

In one embodiment, the at least one or more sensors include one or more selected from:
   a. sound sensors;
   b. proximity sensors;
   c. accelerometers;
   d. gyroscopes;
   e. infrared sensors;
   f. pressure sensors;
   g. ultrasonic sensors;
   h. smoke sensors;
   i. alcohol sensors;
   j. touch sensors;
   k. colour sensor;
   l. tilt sensor;
   m. flow sensor;
   n. level sensors;
   o. light sensors;
   p. temperature sensors;
   q. humidity sensors;
   r. vibration sensors;
   s. gas sensors, including but not limited to carbon dioxide sensors, oxygen sensors, nitrogen sensors, and methane sensors;
   t. or the like.

In one embodiment, the communication module includes a dehumidifier.

In one embodiment, the communication module includes a water purification device.

In one embodiment, the dehumidifier is configured for generating water from humidity in the air.

In one embodiment, the communication module includes a storage tank for storing water generated by the dehumidifier.

In one embodiment, the communication module includes a visual alert generator.

In one embodiment, the visual alert generator is a light source.

In one embodiment, the light source is an LED light.

In one embodiment, the communication module includes an audial alert generator.

In one embodiment, the audial alert generator is one or more selected from a speaker, a whistle and a buzzer.

In one embodiment, the aerially distributable communications device includes a power source.

In one embodiment, the power source is one or more selected from a battery and a capacitor.

In one embodiment, the aerially distributable communications device includes a power generation arrangement.

In one embodiment, the power generation arrangement is at least one or more solar panels.

In one embodiment, the controller is configured to control recharging of the power source by the solar panel.

In one embodiment, the controller is configured for control communications to a gateway communication device.

Software Processes

In one embodiment, the software instructions are configured for directing the processor to:
a. receive a transmitted communication signal from an external similar communications node.

In one embodiment, the software instructions are configured for directing the processor to:
a. store the received communication signal from the external similar communications node.

In one embodiment, the software instructions are configured for directing the processor to:
a. transmitting the received communication signal received from the external similar communications node.

In one embodiment, the received communication signal includes an associated timestamp, and the step of storing and transmitting the received communication signal includes the step of storing and transmitting the associated timestamp, respectively.

In one embodiment, the wireless transmitter and/or receiver (the "transceiver") is configured for low-power and/or short-range wireless communication using one or more selected from the following protocols:
a. Near Field Communication (NFC)
b. Wi-Fi;
c. Bluetooth™;
d. EnOcean;
e. Specified Low-Power (including Broadband or Narrow Band Wi-SUN);
f. LoRaWAN;
g. LpWAN; and
h. any other suitable protocol.

In one embodiment, the wireless transmitter and/or receiver is configured for high-power and/or long-range wireless communications using one or more selected from the following protocols:
a. satellite communication protocols;
b. cellular communication protocols;
c. Wi-Fi; and
d. any other suitable protocol.

Heat Shield

In one embodiment, the aerially distributable communications device is configured for deployment from one or more selected from a spacecraft and a satellite.

In one embodiment, the aerially distributable communications device includes a heat shield for shielding one or more selected from the gyrochute and the communications module on re-entry into an atmosphere in use.

In one embodiment, the heat shield is composed of a plurality of portions.

In one embodiment, the plurality of portions together enclose the gyrochute and applications module.

In one embodiment at least one or more of the plurality of portions are heat resistant.

In one embodiment, the heat shield comprises an upper portion and a lower portion.

In one embodiment, the heat shield comprises a plurality of side portions.

In one embodiment, the plurality of side portions are configured to engage with each other to enclose one or more selected from the gyrochute and the communications module.

In one embodiment, the lower portion includes a heat resistant layer.

In one embodiment, the resistant layer is composed of ceramic.

In one embodiment, the heat shield is configured for being disposed of after re-entry.

In one embodiment, the heat shield is configured for inducing autorotation.

In one embodiment, the plurality of portions of the heat shield are coupled together by a fastening arrangement.

In one embodiment, the controller is configured for operating the fastening arrangement to decouple the plurality of portions of the heat shield.

In one embodiment, the controller is configured for receiving information from sensors indicative of one or more selected from:
a. altitude;
b. velocity;
c. acceleration;
d. wind speed;
e. temperature;
f. or the like.

In one embodiment, the controller is configured for operating the fastening arrangement in accordance with information received from the sensors, in order to determine when to decouple the plurality of portions of the heat shield.

In one embodiment, the heat shield is configured for being thrown outwardly on the coupling of the plurality of portions.

In one embodiment, the heat shield includes at least one or more explosive arrangements for pushing the heat shield away from the gyrochute and/or the communications module.

In one embodiment, the heat shield is configured for being thrown outwardly on the coupling of the plurality of portions by the centrifugal force generated by autorotation of the aerially distributable communications device.

In one embodiment, the fastening arrangement includes at least one frangible fastening member configured for breaking if forces acting on the aerially distributable communications device exceed a threshold limit.

In one embodiment, the plurality of portions of the heat shield are engageable with each other at a labyrinth seal.

In one embodiment, the fastening arrangement includes a locking pin.

In one embodiment, the login pin is receivable within locking formations in the portions, the locking pin being configured for locking the portions together.

In one embodiment, the controller is configured for removing the locking pin from the locking formations.

Multiple Gyrochutes

In one embodiment, the aerially distributable communication device includes a plurality of gyrochutes.

In one embodiment, the aerially distributable communication device includes a frame connecting the plurality of gyrochutes.

In one embodiment, the frame includes supporting formations for supporting a payload.

According to a further aspect, the present invention may be said to consist in a communication network of aerially distributable communication devices as described above.

In one embodiment, the communication network is one or more selected from the following network topologies:
 a. a mesh topology network;
 b. a point-to-point network;
 c. a point to multipoint network;
 d. a star topology network; and
 e. any other suitable topology network.

In one embodiment, the communication network includes a gateway communication module is configured for communication to communication nodes outside of the communication network.

In one embodiment, the gateway communication module is configured for satellite communication to a satellite via a satellite communication network.

In one embodiment, the gateway communication module is configured for communication via medium to long range communication protocols.

In one embodiment, the medium to long range communication protocols include one or more selected from:
 a. satellite communication protocols;
 b. cellular communication protocols;
 c. Wi-Fi; and
 d. any other suitable protocol.

According to a further aspect, the present invention may be said to consist in a method of deploying communications nodes, the method comprising:
 a. providing at least one or more aerially distributable communication devices as described above; and
 b. deploying the at least one or more aerially distributable communication devices from an aircraft.

In one embodiment, the step of deploying the at least one or more aerially distributable communication devices comprises the step of launching the at least one or more aerially distributable communication nodes from an aircraft with an initial angular velocity about the centre of the at least one or more set of blades.

In one embodiment, the step of deploying the at least one or more aerially distributable communication devices comprises the step of launching the at least one or more aerially distributable communication devices or nodes from an aircraft with the at least one or more set of blades aligned substantially in a horizontal plane.

In one embodiment, the step of deploying the at least one or more aerially distributable communication devices comprises the step of wirelessly controlling the control surfaces of at least one of the aerially distributable communication nodes to thereby guide the aerially distributable communication node to a preferred area.

According to a further aspect, the present invention may be said to consist in a heat shield configured for shielding an aerially distributable communications device as described after being deployed from a spacecraft, and during re-entry into the atmosphere.

In one embodiment, the heat shield is composed of a plurality of portions.

In one embodiment, the plurality of portions together enclose the gyrochute and applications module.

In one embodiment at least one or more of the plurality of portions are heat resistant.

In one embodiment, the heat shield comprises an upper portion and a lower portion.

In one embodiment, the heat shield comprises a plurality of side portions.

In one embodiment, the plurality of side portions are configured to engage with each other to enclose one or more selected from the gyrochute and the communications module.

In one embodiment, the lower portion includes a heat resistant layer.

In one embodiment, the resistant layer is composed of ceramic.

In one embodiment, the heat shield is configured for being disposed of after re-entry.

In one embodiment, the heat shield is configured for inducing autorotation.

In one embodiment, the plurality of portions of the heat shield are coupled together by a fastening arrangement.

In one embodiment, the controller is configured for operating the fastening arrangement to decouple the plurality of portions of the heat shield.

In one embodiment, the controller is configured for receiving information from sensors indicative of one or more selected from:
 a. altitude;
 b. velocity;
 c. acceleration;
 d. wind speed;
 e. temperature;
 f. or the like.

In one embodiment, the controller is configured for operating the fastening arrangement in accordance with information received from the sensors, in order to determine when to decouple the plurality of portions of the heat shield.

In one embodiment, the heat shield is configured for being thrown outwardly on the coupling of the plurality of portions.

In one embodiment, the heat shield includes at least one or more explosive arrangements for pushing the heat shield away from the gyrochute and/or the communications module.

In one embodiment, the heat shield is configured for being thrown outwardly on the coupling of the plurality of portions by the centrifugal force generated by autorotation of the aerially distributable communications device.

In one embodiment, the fastening arrangement includes at least one frangible fastening member configured for breaking if forces acting on the aerially distributable communications device exceed a threshold limit.

In one embodiment, the plurality of portions of the heat shield are engageable with each other at a labyrinth seal.

In one embodiment, the fastening arrangement includes a locking pin.

In one embodiment, the login pin is receivable within locking formations in the portions, the locking pin being configured for locking the portions together.

In one embodiment, the controller is configured for removing the locking pin from the locking formations.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DESCRIPTION OF EMBODIMENTS

Figure 1:
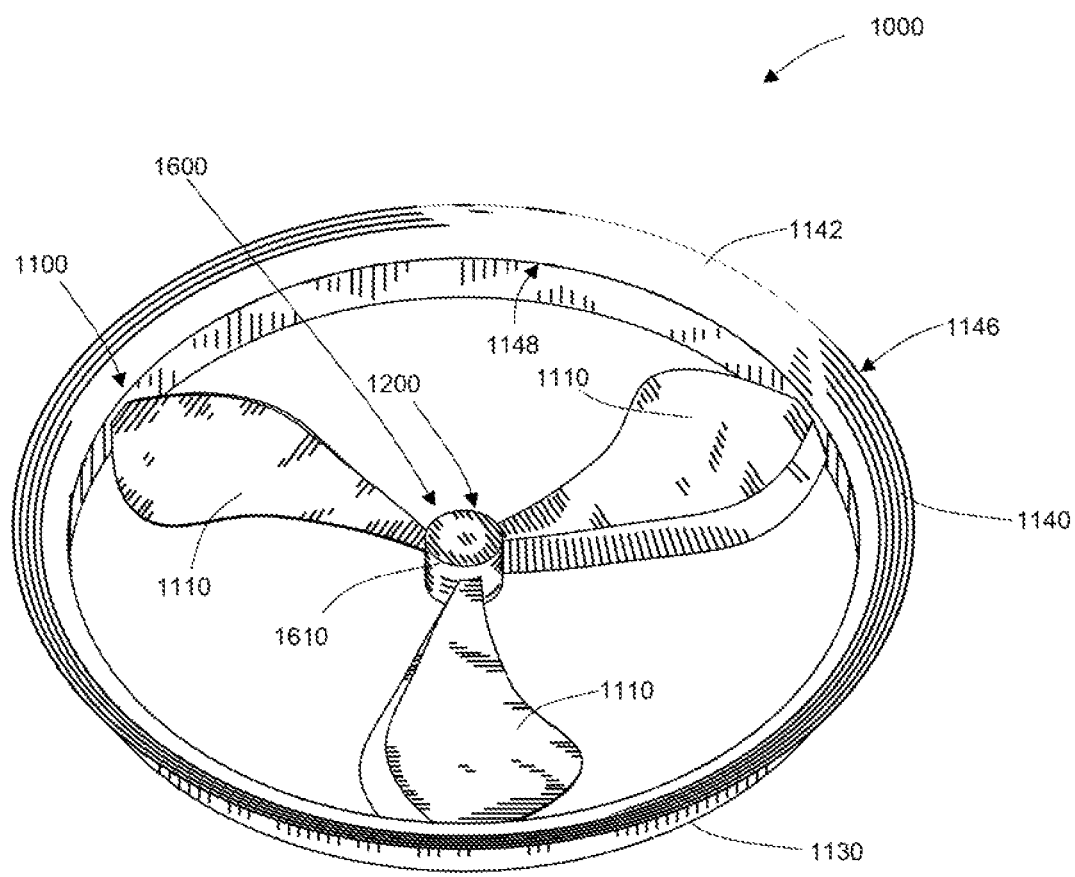
FIG. 1 shows a top perspective view of a first embodiment of an aerially distributable communications device.
Figure 2:
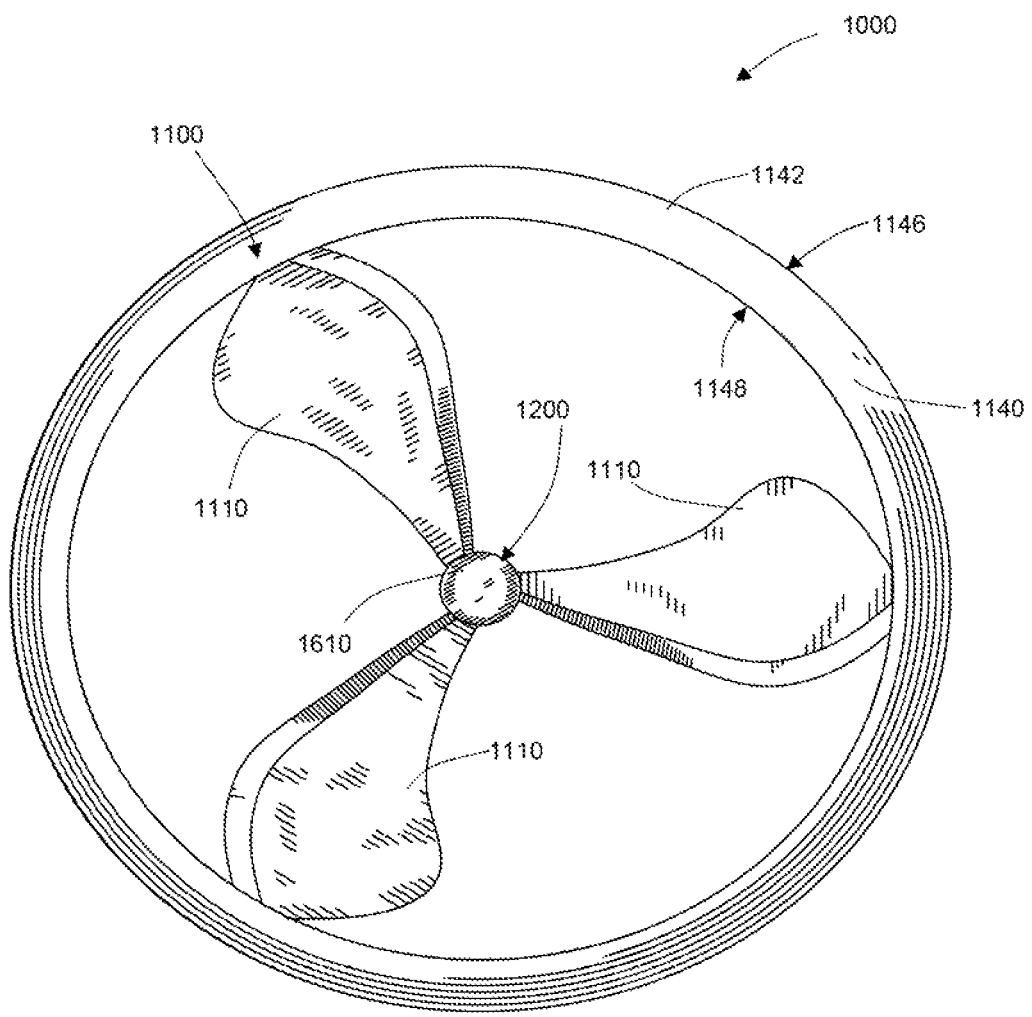
FIG. 2 shows a top view of the aerially distributable communications device of FIG. 1.
Figure 3:
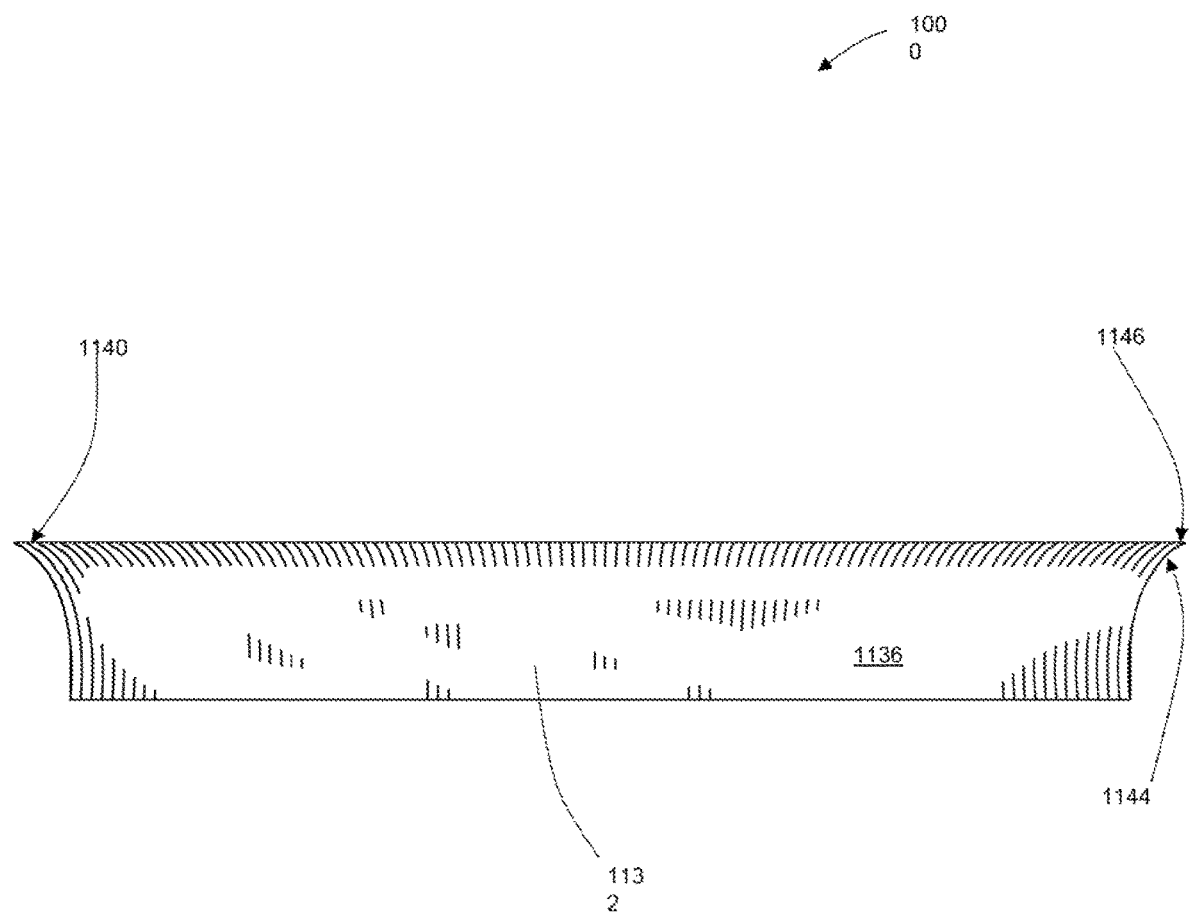
FIG. 3 shows a side view of the aerially distributable communications device of FIG. 1.
Figure 4:
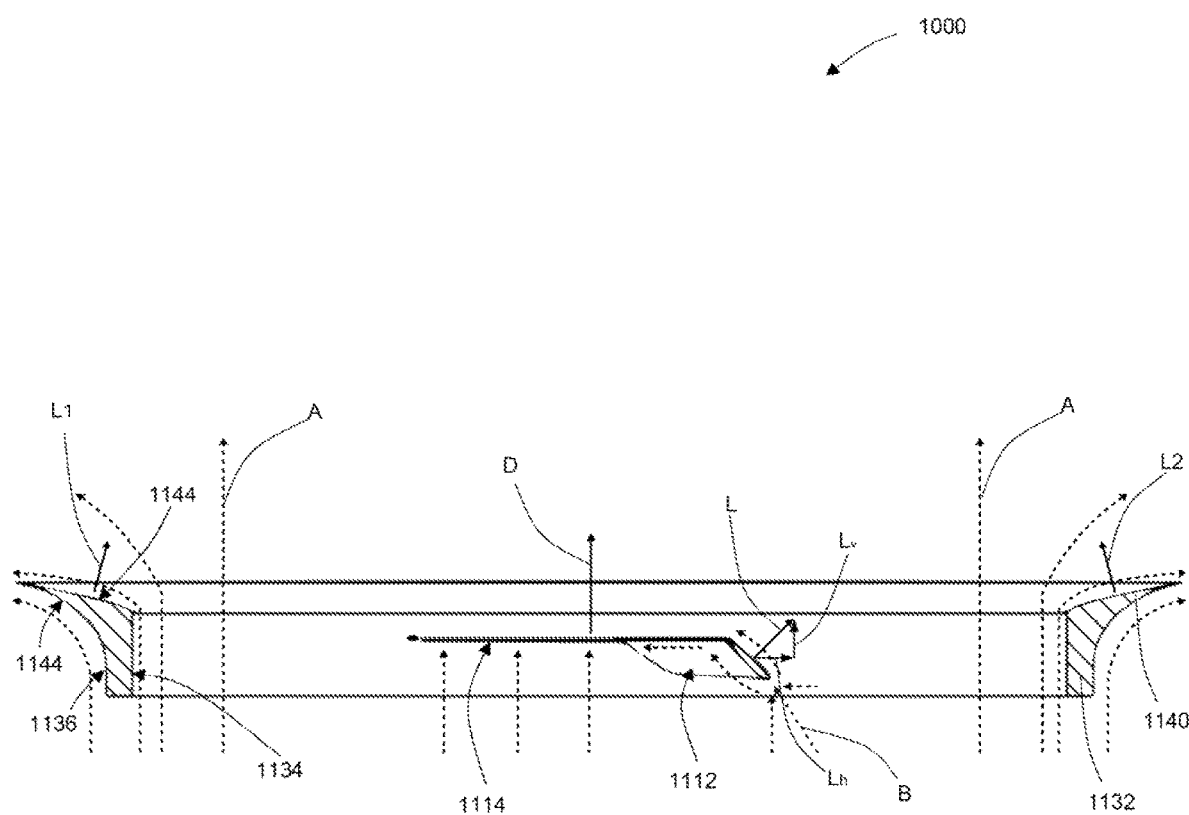
FIG. 4 shows a side elevation cutaway view of the aerially distributable communications device of FIG. 1, showing airflow during deployment.

It should be noted in the following description that like or the same reference numerals in different embodiments denote the same or similar features.

An aerially distributable communications device according to a first aspect of the invention is generally indicated by the numeral 1000. A communications network according to a second aspect of the invention is generally indicated by the numeral 2000.

In FIGS. 4, 5, 9 and 10, airflow is shown by broken arrows.

Now described with reference to the figures, there is provided an aerially distributable communications device 1000. The aerially distributable communications device 1000 includes a gyrochute 1100 and a communications module 1200.

The gyrochute 1100 includes a body 1600 and one or more sets of blades. The body 1600 can include a hub 1610, and may include a hollow formation surrounding the set of blades. The hollow formation acts as a vertical stabiliser and acts to reduce wingtip vortices, thereby increasing the lift generating efficiency of the blades.

The aerially distributable communications device 1000 is configured for deployment from an aircraft (not shown) as will be described in more detail below. In order to facilitate such deployment, the gyrochute 1100 is configured for providing lift force in order to slow the rate of fall of the aerially distributable communications device 1000. In order to generate lift force, the gyrochute 1100 is configured for inducing autorotation of the gyrochute 1100 as it falls during deployment, as will be described in more detail below. The autorotation of the gyrochute could be clockwise or counterclockwise according to design preference.

As shown in FIGS. 1-5, the gyrochute includes a single set of three blades 1110 connected to each other at a central hub 1610. The gyrochute also includes an open-ended hollow formation in the form of a cylindrical formation 1130 extending around the outer periphery of the blades 1110. Each of the blades 1110 are rigidly connected to the cylindrical formation 1130 at their outer periphery.

The cylindrical formation 1130 is configured for guiding airflow through the centre of the cylindrical formation as a main column of airflow (shown as arrow A in FIGS. 4, 5, 9 and 10). The cylindrical formation 1130 includes a cylindrical wall 1132 that defines an inner surface 1134 and an outer surface 1136. The blades 1110 are connected to the inner surface 1134 of the cylindrical wall 1132 at a point about midway between the open ends of the cylindrical formation 1130. In alternative embodiments, the blades 1110 may be connected at any point along the length of the inner surface.

The blades 1110 each include an autorotation portion 1111 in the form of an aerofoil portion 1112 and a preferably planar extended trailing edge 1114. Preferably the extended trailing edge 1114 extends in parallel with the general plane of the gyrochute 1100, and also in parallel with the upper edge of the cylindrical formation 1130. Preferably the extended trailing edge extends perpendicularly to the vertical column of air A when the aerially distributable communications device 1000 is in stable flight. In this way, the extended trailing edge provides the greatest resistance to the flow of the vertical column of air A.

Preferably, the pitch of the aerofoil portion (when the aerially distributable communications device 1000 is being deployed in stable flight/equilibrium in use) extends downwardly below the horizontal, while the extended trailing edge 1114 extends substantially horizontally.

The intended functionality of the extended trailing edge 1114 is to provide a drag force (shown as arrow D in FIG. 4) in a vertical direction on the main column of air passing through the cylindrical formation.

The intended functionality of the autorotation portion in the form of aerofoil portion 1112 is to generate lift force (shown as arrow L in FIG. 4) from air passing over the aerofoil portion. This lift And to induce an autorotation effect in the gyrochute 1000 during deployment when it is falling through the air. The lift force L has an azimuthal rotational component $L_h$ that extends horizontally to induce autorotation of the gyrochute. The lift force L also has a vertical component $L_v$ that increases further serves to reduce the rate of fall of the aerially distributable communications device 1000 during deployment. Preferably the pitch of the aerofoil portion 1112 is between 0° and 90° in use when the aerially distributable communications device is generally aligned in a horizontal plane and falling in stable flight or equilibrium. Each aerofoil portion of the blade preferably has a pitch distribution that varies over its length depending on its radius from the hub in order to optimise the effect of the aerofoil portion. As air travelling over the aerofoil portion 1112 will be foster towards the outer extents of the, the relative wind angle will be more horizontally inclined, and the pitch of the aerofoil portion is not required to be as downwardly inclined.

It is envisaged that initially once the aerially distributable communications device 1000 is deployed, for example from an aeroplane, the total incident air velocity will start off being directly vertically upwardly. In this state, it is envisaged that the aerofoil portion 1112 will generating relatively small amounts of vertical lift Lv while it is in a state of stall. However vertical airflow A moving over the aerofoil portion 1112 will generate lift L. The horizontal or azimuthal rotational component $L_h$ of the lift L will cause an increased angular velocity of autorotation. As autorotation speeds up, the relative direction of the airflow moves from being directly vertically to being more angled, as shown by arrow B in FIG. 4. This angled airflow is more conducive to the generation of lift L by the aerofoil portion 1112, causing it to generate increased azimuthal rotational component $L_h$, causing increased autorotation, and also increased vertical lift $L_v$, serving to slow fall of the gyrochute. Eventually, the lift forces L, $L_h$, $L_v$ will be balanced by the increase drag forces from the increased airflow, and the system will reach equilibrium or stable flight.

In alternative embodiments (not shown), it is envisaged that the blades could be pivotably connected to the cylindrical formation and/or hub, so as to be able to vary the pitch of the blades. It is further envisaged that controllable motors may be provided to allow the pitch of the blades to be controlled remotely. Such motors could be located in the hub, or built into the cylindrical formation. The blades could be pivotable on an axle extending into the hub/cylindrical formation.

It is envisaged that the blades 1110, hub 1610 and cylindrical formation 1130 will preferably be integrally formed, for example by a moulding process such as injection moulding, blow moulding, rotary moulding, or the like. In this regard, it is also envisaged that the gyrochute 1100 will preferably be composed of lightweight material (such as plastic, a resin fibre composite such as carbon fibre, glass fibre or the like) so that the lift generated by the gyrochute 1100 will have a greater effect in slowing down the fall of the aerially distributable communications device 1000 during deployment. Preferably, the materials chosen for construction of the gyrochute will be less dense than water, allowing the aerially distributable communications device to float if it happens to land in water. Alternatively and/or additionally, it is envisaged that any portion of the gyrochute could include a sealed hollow portion enabling the aerially distributable communications device to float in water. It is further envisaged that in an alternative embodiment (not shown) the aerially distributable communications device could include an inflatable bladder and a compressed gas source that causes the inflatable bladder to be inflated if it is detected that the aerially distributable communications device has landed in water. Such detection on actuation can be provided by the controller and/or sensors as discussed in further detail below.

It is the intention that the aerially distributable communications devices 1000 will be deployed in mass, and once deployed (for example in the case of a natural disaster) they will be picked up by locals and preferably kept by them. In this way, it is expected that there will be taken to areas of highest concentration of population density, and the communication functionality provided by the aerially distributable communications devices 1000 will in this way be increased. For this reason, it is preferable that the aerially distributable communications devices 1000 be manufactured as cheaply as and conveniently as possible.

In the embodiments shown in FIGS. 1-14 and 16, the gyrochute 1100 further includes an annular flange 1140 or lip extending outwardly from an upper edge of the cylindrical formation 1130. The annular flange 1140 includes a curved upper surface 1142, and a curved lower surface 1144. The upper surface 1142 and the lower surface 1144 meet at an outer edge 1146. The curved upper surface 1142 curves downwardly towards the blades from the outer edge 1146 to meet with the inner surface 1134 of the cylindrical formation 1130 at inner edge 1148. The curved lower surface 1144 similarly extends downwardly from the outer edge 1146 to engage tangentially with the outer surface 1136 of the cylindrical formation 1130.

In an alternative embodiment, the upper surface and/or lower surface need not be curved, and can be planar or flat in configuration, however this is not preferred as the applicant believes that this will not generate the same amount of stabilising effect as will be described in more detail below. In another embodiment (not shown), the annular flange can be pivotably attached to the cylindrical formation to be stowed out of the way for storage and/or transport. It is further envisaged that any aspect of the body and/or blades can be modifiable to be foldable/removable/reconfigurable to allow for reduced space requirements during transport and/or storage.

The curved upper surface of the annular flange 1140 is configured for inducing the main column of airflow within the cylindrical formation to flow radially outwardly over the aerofoil shape of the radial cross-section of the curved upper surface in use during deployment of the aerially distributable communications device 1000 from an aircraft. This helps to generate additional lift force and slow down the rate of descent of the aerially distributable communications device 1000.

Similarly, airflow over the outer surface 1136 of the cylindrical formation 1130 will continue upwardly and outwardly along the lower surface of the 1144. This has an effect on the stability of the aerially distributable communications device 1000 during aerial deployment as will be described in more detail below.

It is envisaged that during deployment, while the aerially distributable communications device 1000 is falling from an aircraft, it may be subject to buffeting forces, or could be incorrectly deployed. For this reason, the gyrochute 1100 is preferably configured to self-stabilise. Such self-stabilisation is explained below with reference to FIG. 5.

Airflow A in the main column passing through the cylindrical formation (shown as arrow A in FIGS. 4, 5, 9 and 10) nearby the inner surface 1134 of the cylindrical formation 1130 is drawn outwardly over the upper surface 1142, generating lift force. When the cylindrical formation 1130 and annular flange 1140 is aligned horizontally, lift force is generated equally around the periphery of the cylindrical formation.

Figure 5:
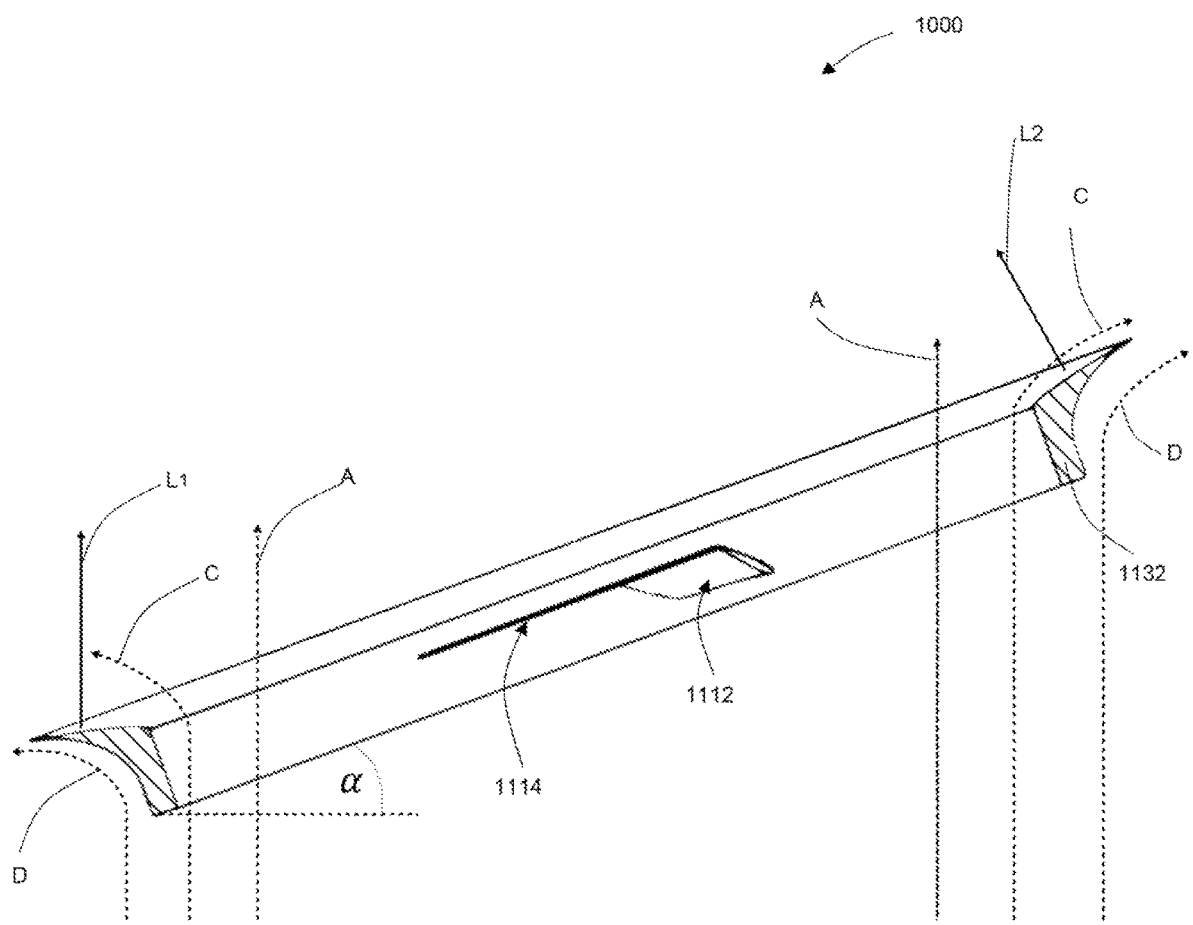
FIG. 5 shows a side elevation cutaway view of the aerially distributable communications device of FIG. 1, showing airflow during deployment when tilted to the horizontal.
Figure 6:
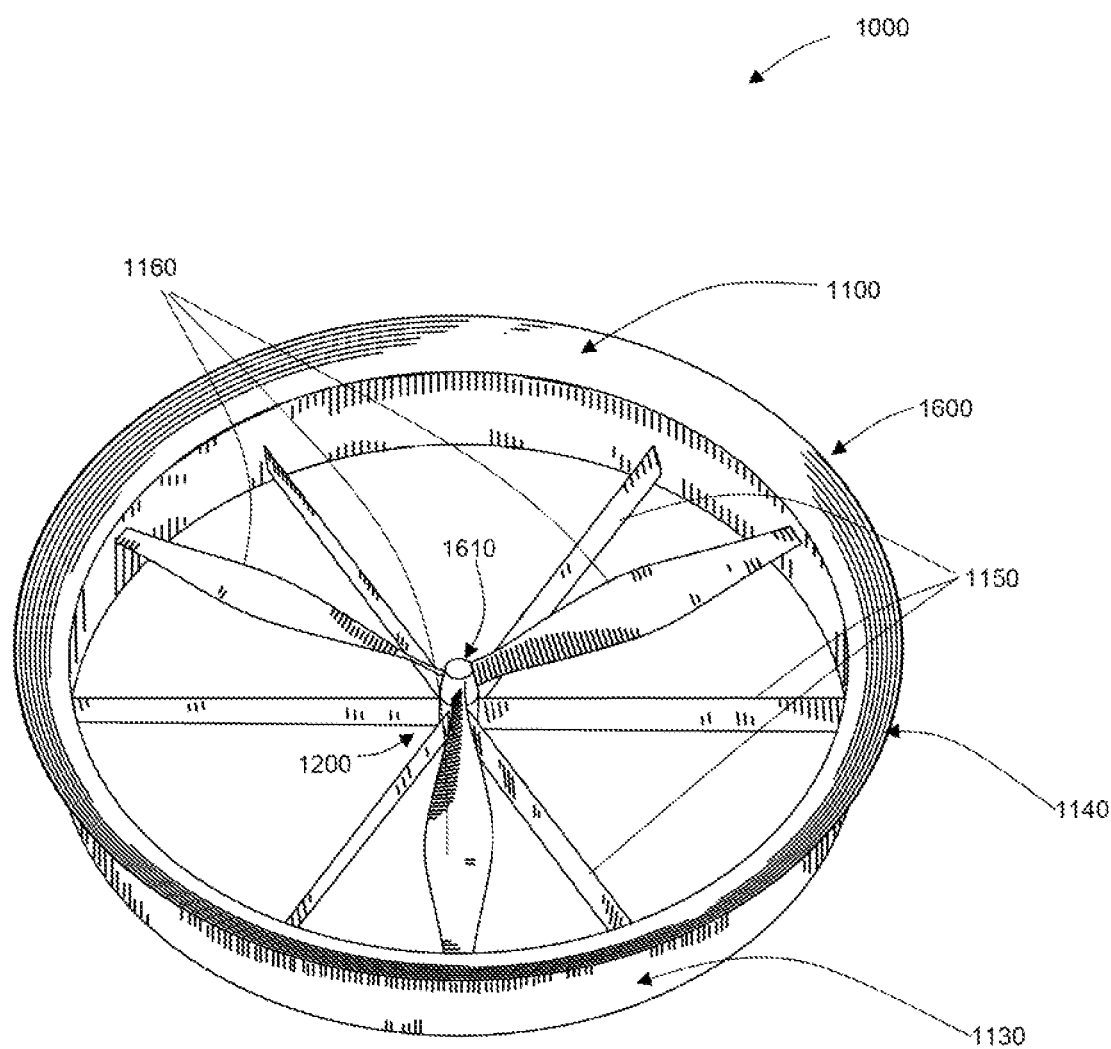
FIG. 6 shows a top perspective view of a second embodiment of an aerially distributable communications device.
Figure 7:
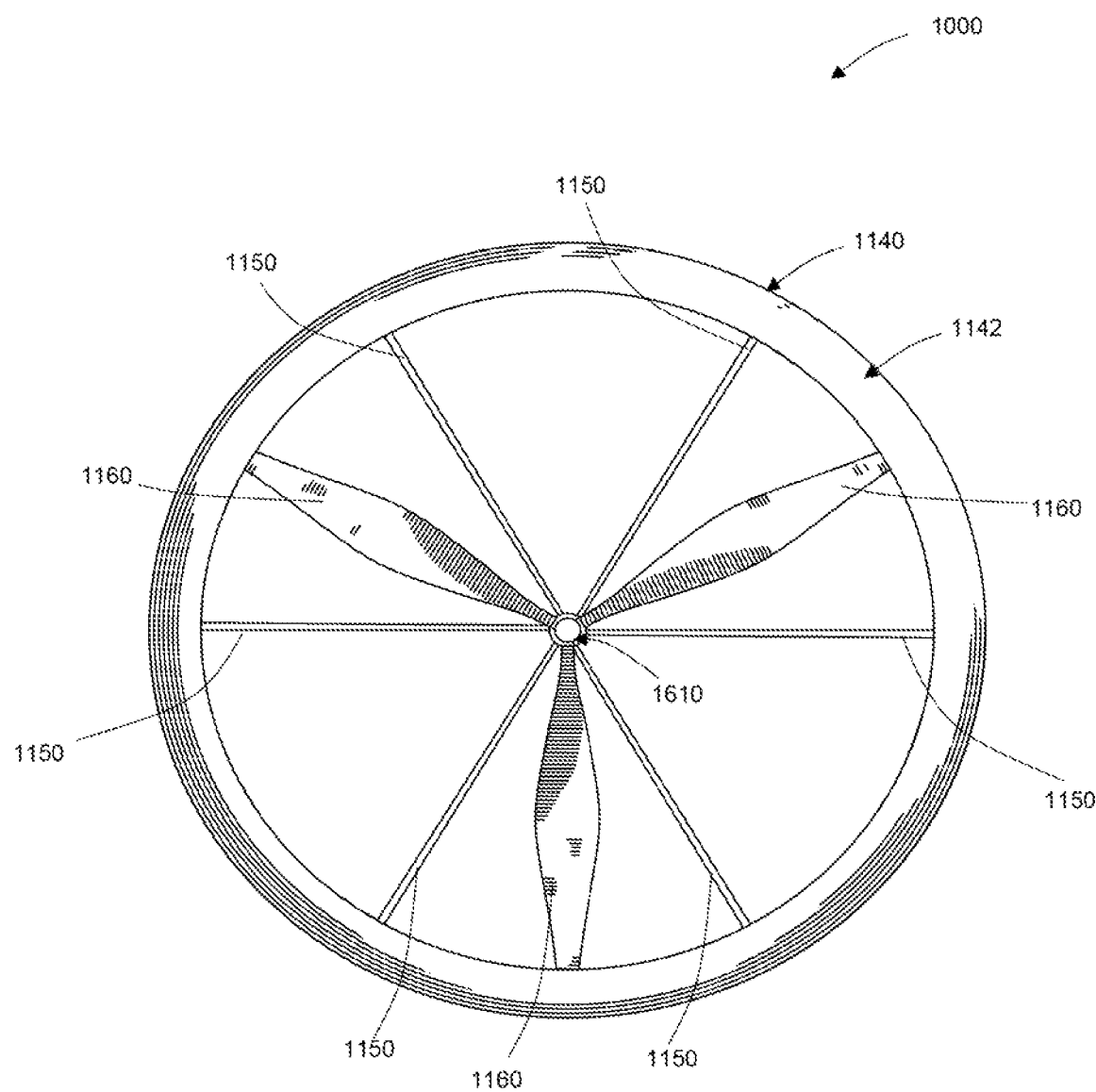
FIG. 7 shows a top view of the aerially distributable communications device of FIG. 6.
Figure 8:
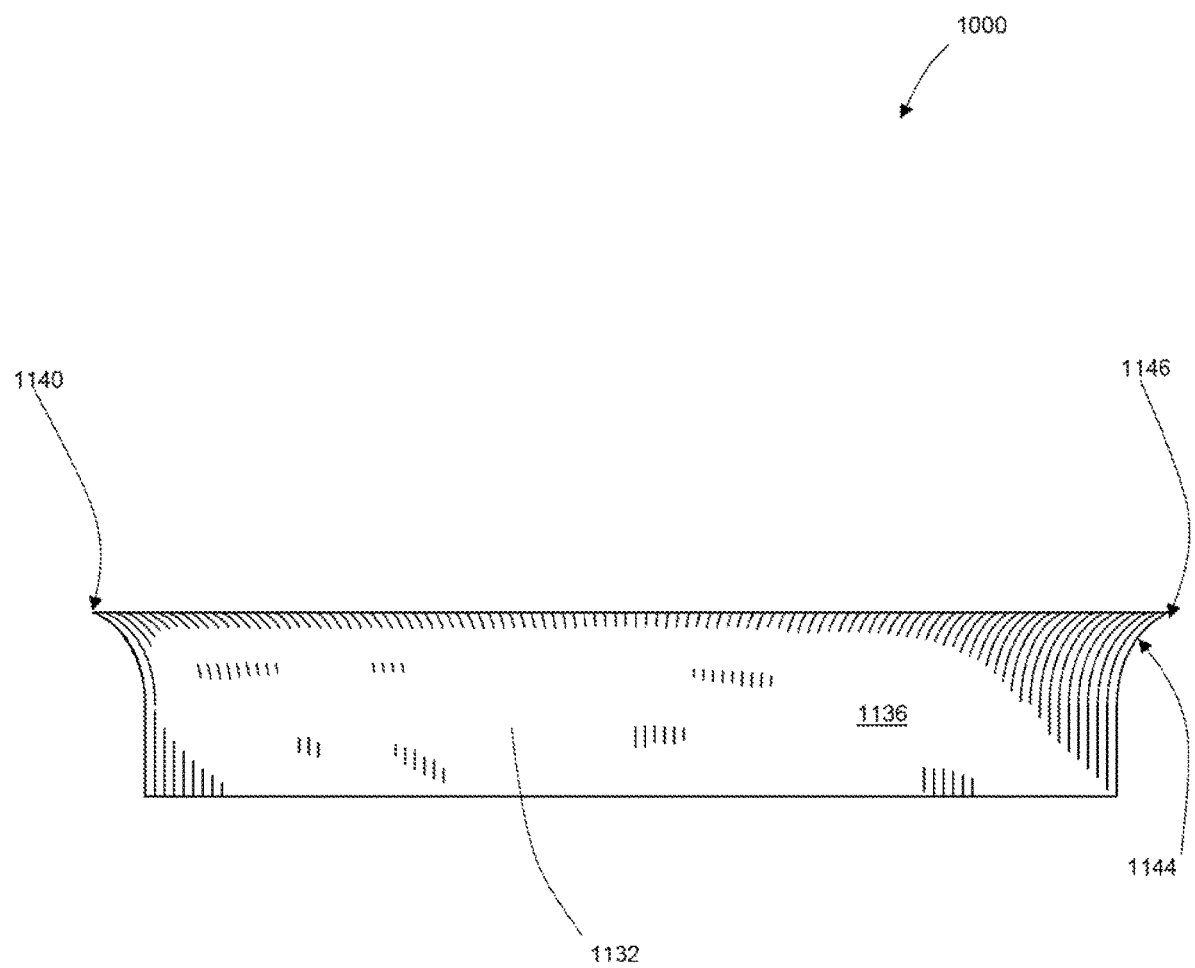
FIG. 8 shows a side view of the aerially distributable communications device of FIG. 6.
Figure 9:
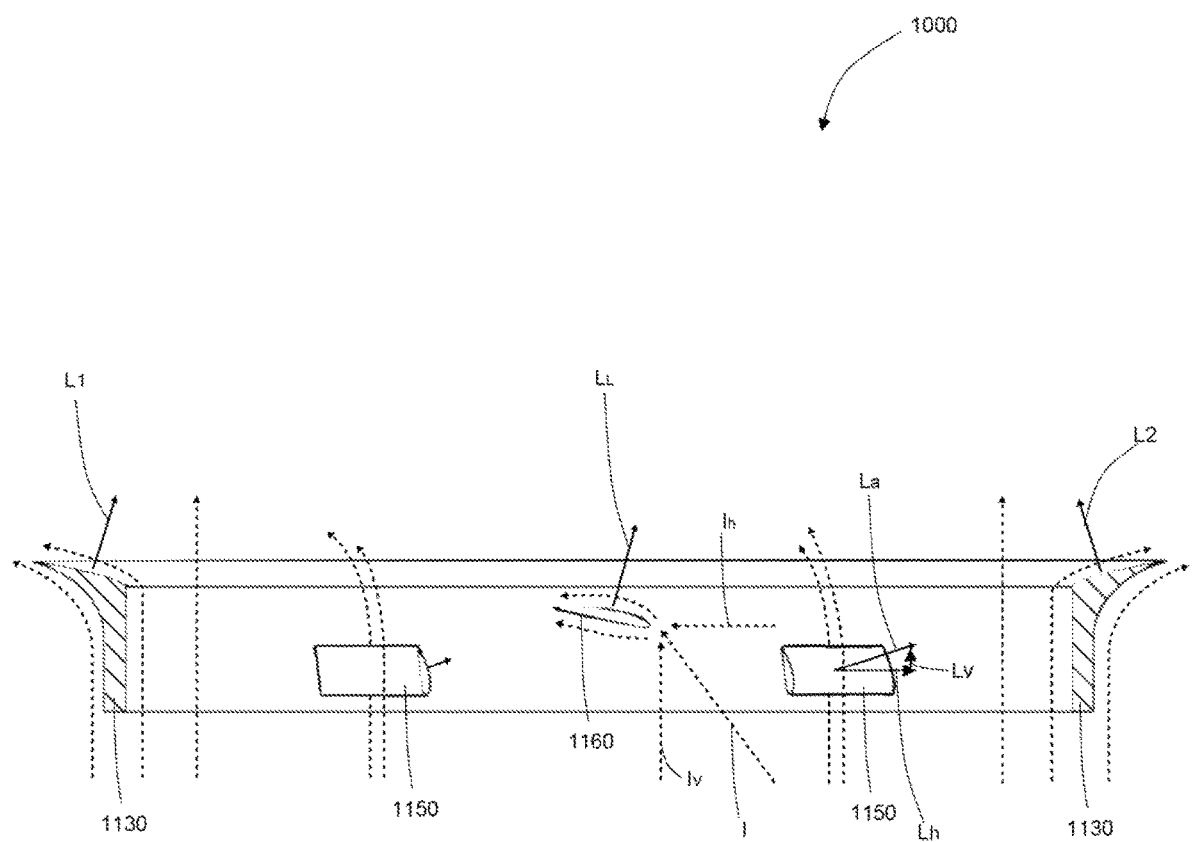
FIG. 9 shows a side elevation cutaway view of the aerially distributable communications device of FIG. 6, showing airflow during deployment.
Figure 10:
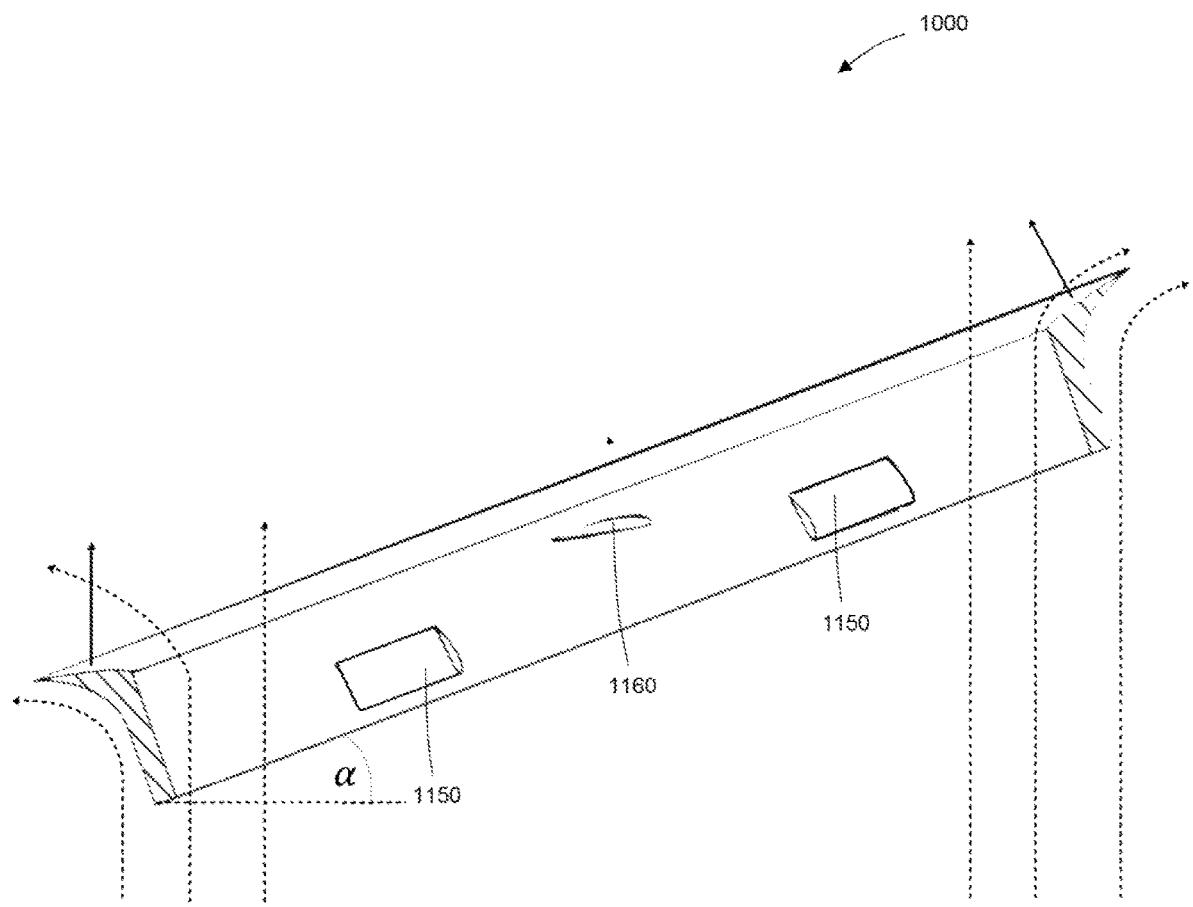
FIG. 10 shows a side elevation cutaway view of the aerially distributable communications device of FIG. 6, showing airflow during deployment when tilted to the horizontal.
Figure 11:
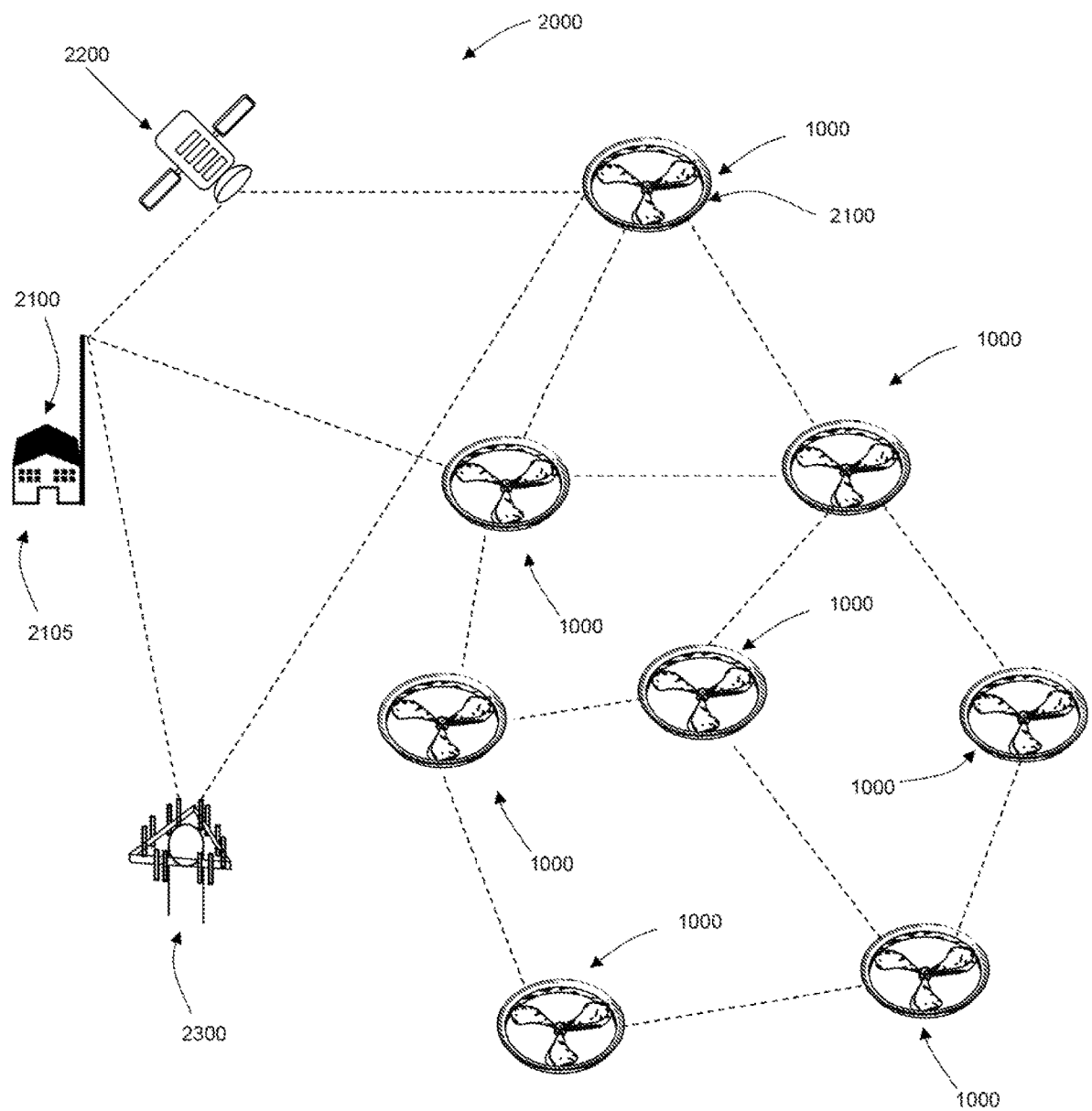
FIG. 11 shows a schematic view of a communications network of aerially distributable communications devices relaying information in a mesh topology.

However, when the cylindrical formation 1130 and annular flange 1140 are not aligned with the horizontal (as shown in FIGS. 5 and 10), and are instead aligned at an angle α to the horizontal, airflow shown as arrow C over the lowest portion of the upper curved surface 1142 will generate an increased amount of lift force relative to the airflow C flowing over the highest portion of the upper curved surface 1142. This is shown in FIG. 5, where $L_1$ is the lift force generated by the lowest portion, $L_2$ is the lift force generated by the highest portion, and $L_1 > L_2$. The difference between $L_1$ and $L_2$ serves to slow the fall of the lowest portion more than the fall of the highest portion, causing the lowest portion to rise relative to the highest portion, and eventually stabilising both the highest and lowest portions of the annular flange 1140 at equal heights.

Further, airflow (shown as arrow D) travelling over the outer surface 1136 of the cylindrical formation 1130 is deflected outwardly by the curved lower surface 1144 of the annular flange 1140. As may be seen from FIGS. 5 and 10, the deflection of this airflow outwardly is more pronounced for the lowest portion of the curved lower surface 1144 than the highest portion. This will mean that the airflow D over the lowest portion of the curved lower surface 1144 will generate a greater upward force on the lower portion of the curved lower surface than on the highest portion. This generates a finite moment that corrects the angle of tilt to an equilibrium position, when the forces on opposing sides are balanced.

In another embodiment shown in FIGS. 6-10 the gyrochute 1100 is provided with two sets of blades. A first set of blades are three autorotation inducing blades 1150, and the second set of blades are a set of three lift force inducing blades 1160. The first set of three autorotation inducing blades 1150 are rigidly connected to a central hub 1610, and to a cylindrical formation 1130 at their outer periphery, similarly to the previous embodiment shown in FIGS. 1-5. However, in the embodiment shown in FIG. 6-10, the autorotation inducing blades 1150 present a steep downward pitch when the gyrochute is in equilibrium during deployment relative to the pitch presented by the set of three lift force inducing blades 1160. The autorotation inducing blades 1150 present the relatively steeper downward pitch with a view to primarily generating autorotation forces $L_a$ (shown in FIG. 9) over their aerofoil shape to cause autorotation of the gyrochute 1100 during deployment. This autorotation force $L_a$ has a larger azimuthal rotational component $L_h$ force component, relative to vertical lift component $L_v$, causing the blades 1150 (and hence the gyrochute) to accelerate quicker horizontally in a rotational motion, in order to induce autorotation faster. In a preferred embodiment, the autorotation inducing blades 1150 are configured to present a variation in their pitch of between 0° to 90° downwardly from the horizontal. The variation in the pitch of the autorotation inducing blades preferably varies over their length or radius from the hub.

The gyrochute 1100 further includes a second set of three lift force inducing blades 1160 that are preferably rigidly coupled to each other to extend radially from the hub 1610. The lift force inducing blades 1160 are rigidly connected to the hub 1610 and to the cylindrical formation 1130. The lift force inducing blades 1160 have an axis of rotation preferably concentric with the centre or axis of the cylindrical formation 1130. The lift force inducing blades 1160 present a pitch that varies over their radius from the hub of between 0° to 90° downwardly from the horizontal in use when the aerially distributable communications device 1000 is being deployed and is in equilibrium. Airflow incident on the lift force inducing blades (shown in FIG. 9 as arrow I) will have both a vertical component $I_v$ related to the downward velocity of the gyrochute 1100, as well as a horizontal component $I_h$ related to the angular velocity of the autorotation. The faster the angular velocity of the autorotation, the more horizontal the incident angle of airflow I.

The lift force inducing blades 1160, the autorotation inducing blades 1150 and the cylindrical formation 1130 are all preferably concentric, extending radially from the hub. The lift force inducing blades 1160 present with a more horizontal pitch than the autorotation inducing blades 1150, so that incident airflow during autorotation will pass over the lift force inducing blades 1160 creating a lift force $L_L$ acting mainly vertically upwards, helping to slow the fall of the aerially distributable communications device 1000 during deployment. The autorotation inducing blades 1150 will deflect airflow passing over them to become incident airflow for the lift force inducing blades 1160.

Figure 12:
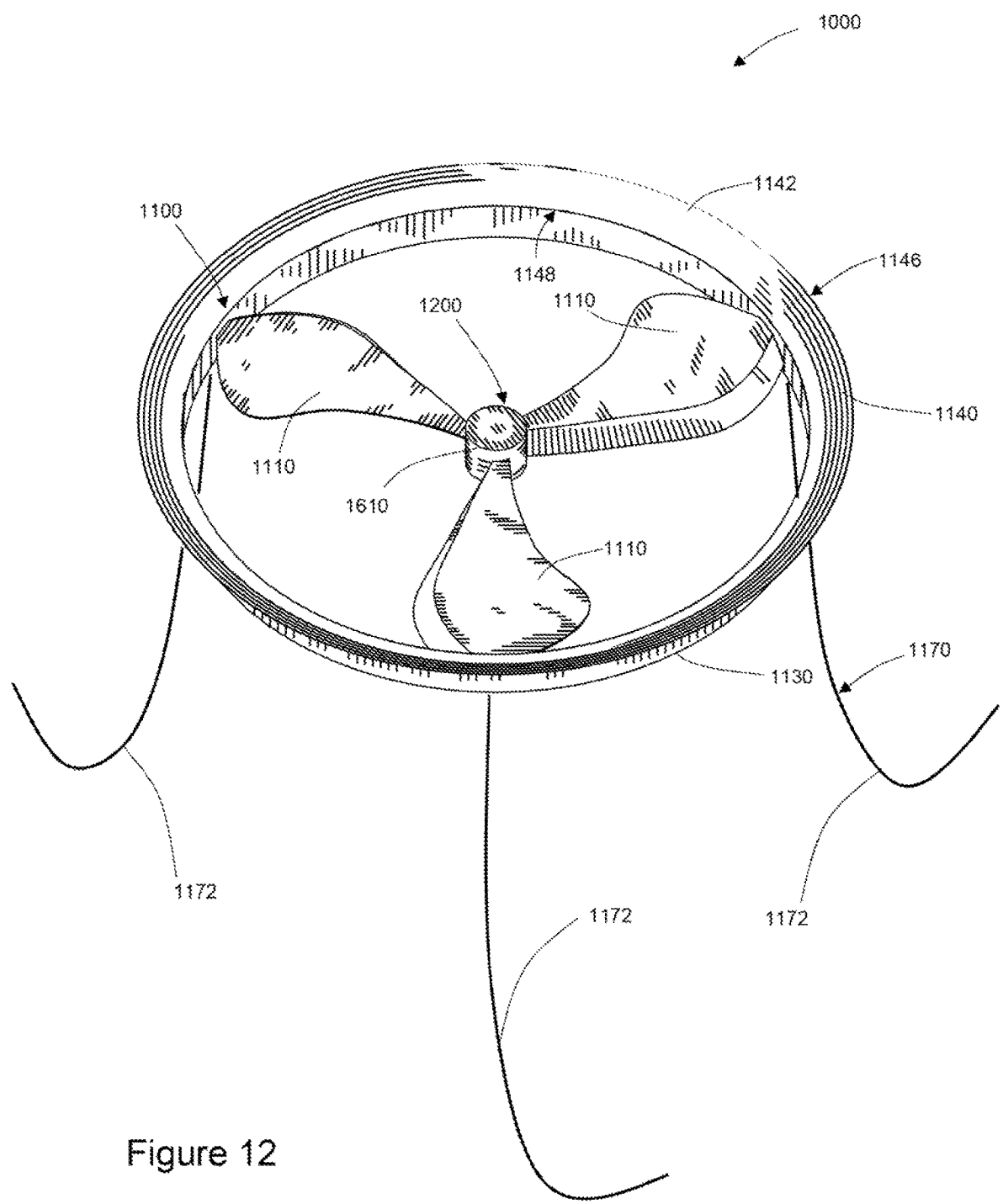
FIG. 12 shows a top perspective view of a third embodiment of an aerially distributable communications device.

In another embodiment shown in FIG. 12, it is envisaged that the aerially distributable communications device 1000 can be provided with preferably lightweight leg structures 1170. The leg structures 1170 shown in FIG. 12 are curved elongate members 1172 composed of resilient material such as spring steel, plastic, resin fibre material, or the like. The leg structures 1170 preferably extend outwardly from the cylindrical formation.

The leg structures 1170 can serve several functions in that they serve to cushion the impact of the aerially distributable communications device 1000 on landing, provide ground clearance of the communications module 1200 to allow for increased communication range, and can extend outwardly of the cylindrical formation 1130 (without unduly interfering with the airflow during deployment) to increase the area coverage when viewed from the top, and help to ensure that the aerially distributable communications node 1000 only lands the right way up. It is envisaged that such landing or leg structures can be provided in a wide variety of configurations and/or shapes that will be apparent to person skilled in the art.

Figure 13:
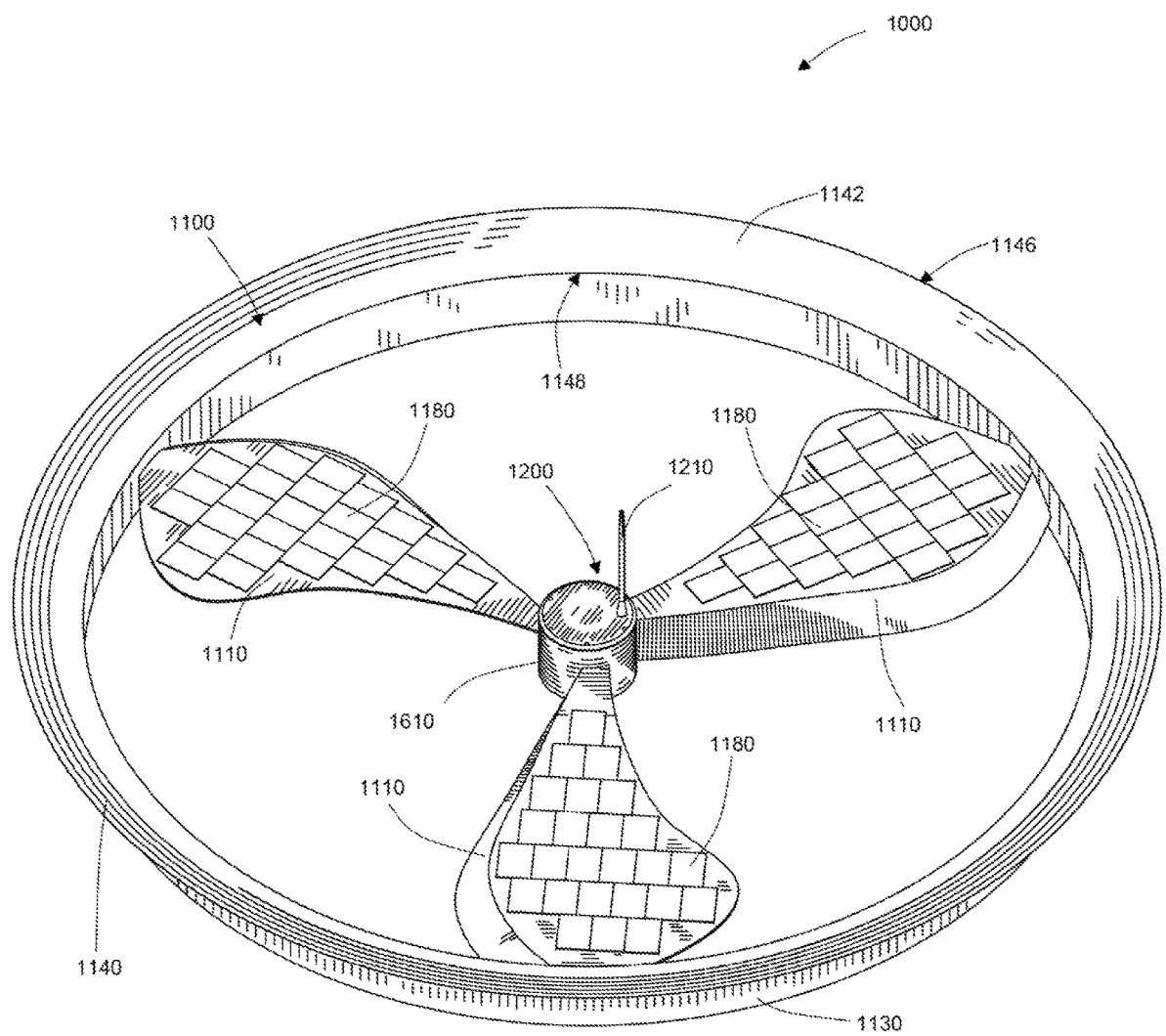
FIG. 13 shows a top perspective view of a fourth embodiment of an aerially distributable communications device.

In another embodiment shown in FIG. 13, the aerially distributable communications device 1000 further includes a power generation arrangements in the form of solar panels 1180. The solar panels 1180 shown as being distributed over the upper surface of blades 1110, however it is envisaged that the solar panels could also be distributed over the upper surface 1142 of the annular flange 1140.

The solar panels 1180 are preferably configured for charging a power storage device such as a battery or capacitors. In turn, the power storage device will be used to power operation of the communications module 1200 as will be described in more detail below.

In the embodiment shown in FIG. 13, the communications module 1200 is further provided with an externally extending antenna 1110 for increasing the communication range of the communications module. It is further envisaged that an external antenna can be built or moulded into the cylindrical formation 1130 and/or the blades.

Figure 14:
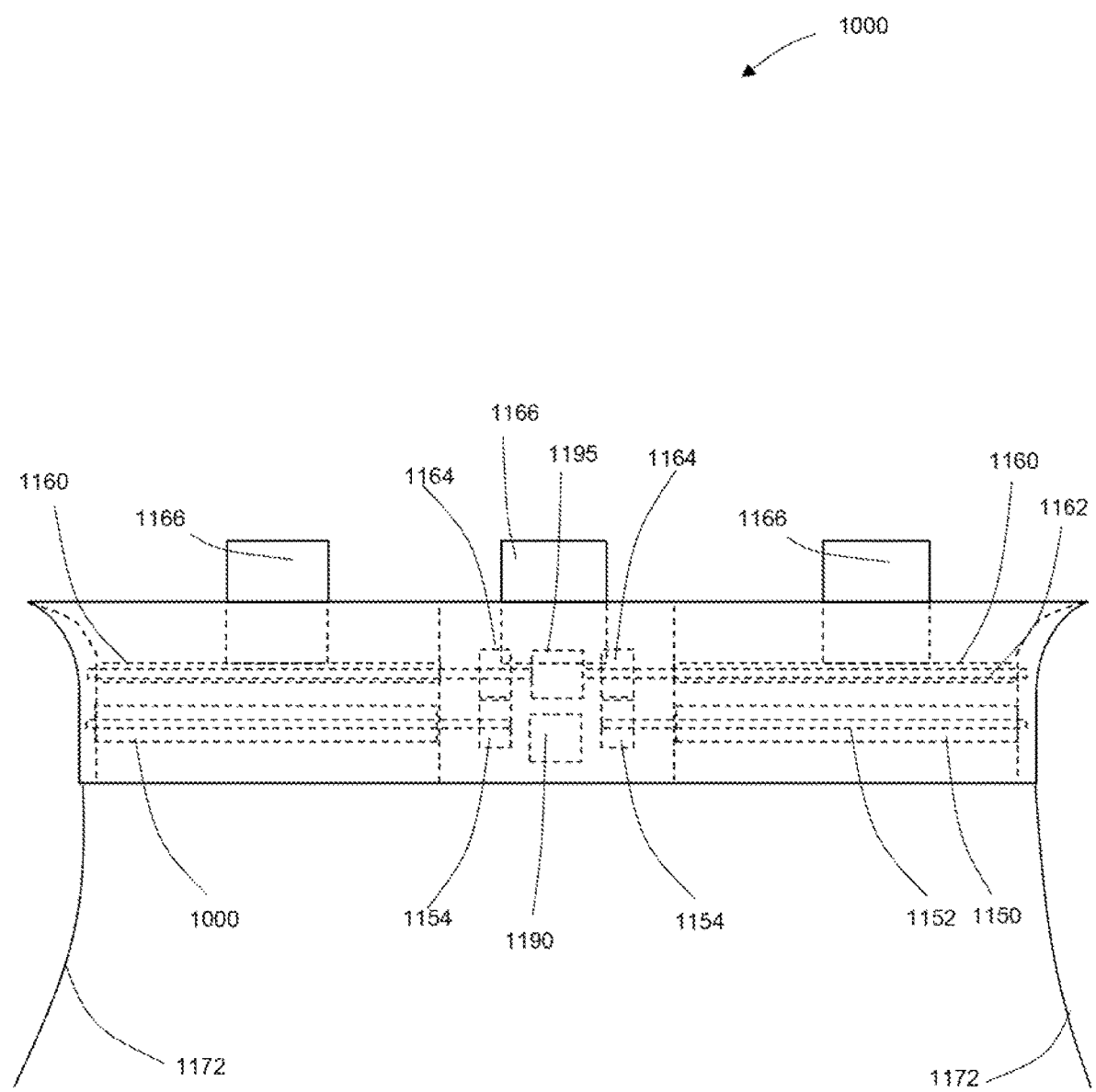
FIG. 14 shows a side elevation view of a fifth embodiment of an aerially distributable communications device.

As shown in FIG. 14, in a further embodiment it is envisaged that autorotation inducing blades 1150 and/or lift force inducing blades 1160 can be pivotably movable about their longitudinal axis to thereby change their pitch. Preferably, each of the autorotation inducing blades 1150 and the lift force inducing blades 1160 are rotatable about a central axle 1152, 1162 respectively, with their pitches being variable between 0 and 180 from the horizontal. Electrical control motors 1154 and 1164 are provided for pivoting the autorotation inducing blades 1150 and/or the lift force inducing blades 1160, respectively. Such electrical control motors 1154 and 1164 can be controlled by a controller 1190, which is preferably controlled remotely from a remote controller by wireless radio frequency control. Alternately, the controller can be preprogramed before deployment to control the autorotation inducing blades 1150 and/or lift force inducing blades 1162 to steer movement of the aerially distributable communications device 1000 to a predetermined destination or zone.

It is further envisaged that additional control surfaces, such as a tail or any other suitable configuration aerofoil or formation can be provided, for steering of the aerially distributable communications device 1000 during deployment to guide it to a preferred landing area. In another alternative embodiment (not shown) it is envisaged that at least part of the annular flange, or portions thereof may be rotatable about the upper edge of the cylindrical formation, to thereby act as control surfaces for the guidance of the aerially distributable communications device. Such steering portions may similarly be controlled by electric motors by the controller or remotely.

In alternative embodiments (not shown), the external antenna can also be spring released for example as a sprung telescopic arrangement, electrically driven by electrically motors between a deployed and a retracted position, or launched into the air via balloon, preferably using the same compressed gas canister that would be used for inflation of the inflatable bladder described above.

It is further envisaged that the power storage device can be used to power external devices such as phones via a charging port (not shown).

In alternative embodiments (not shown), it is envisaged that the gyrochute can have any number of blades or blade sets, as long as the blades are configured to, whether in combination and/or individually, generate autorotation and lift force and/or drag force during deployment of the aerially distributable communications device 1000. For example, in an alternative embodiment (not shown) it is envisaged that two pairs of counter rotating pivoting blades may be provided for producing lift force, as well as a further fixed set of blades for autorotation. It is further envisaged that a pair of counter rotating blade sets may be provided that rotate relative to a central hub which does not rotate. It is envisaged that this may allow for sensitive electronics that will be affected by acceleration to be provided on the hub.

It is envisaged that aerially distributable communications devices can be provided in substantial sizes, ranging from 30 cm to 5 m in diameter, allowing for additional componentry to be added. For example, in a further embodiment (not shown), it is envisaged that a dehumidifier apparatus and/or water purification device may be provided in the central hub, or slung underneath the gyrochute 1100. The dehumidifier apparatus may be powered by the battery and serve to generate clean water from the atmosphere. Water generated by the dehumidifier apparatus can be distributed continuously from an outlet into a storage tank provided.

As aerially distributable communications devices 1000 of larger diameter may be hazardous to people on the ground during deployment, it is further envisaged that a visual and/or audial alert device will be provided to alert people on the ground that one is approaching. An example of a visual alert may be a flashing light or lights, or mirrors located on the cylindrical formation. An example of an audial alert may be a speaker, buzzer, or alternatively a whistle that is actuated by airflow.

Figure 20:
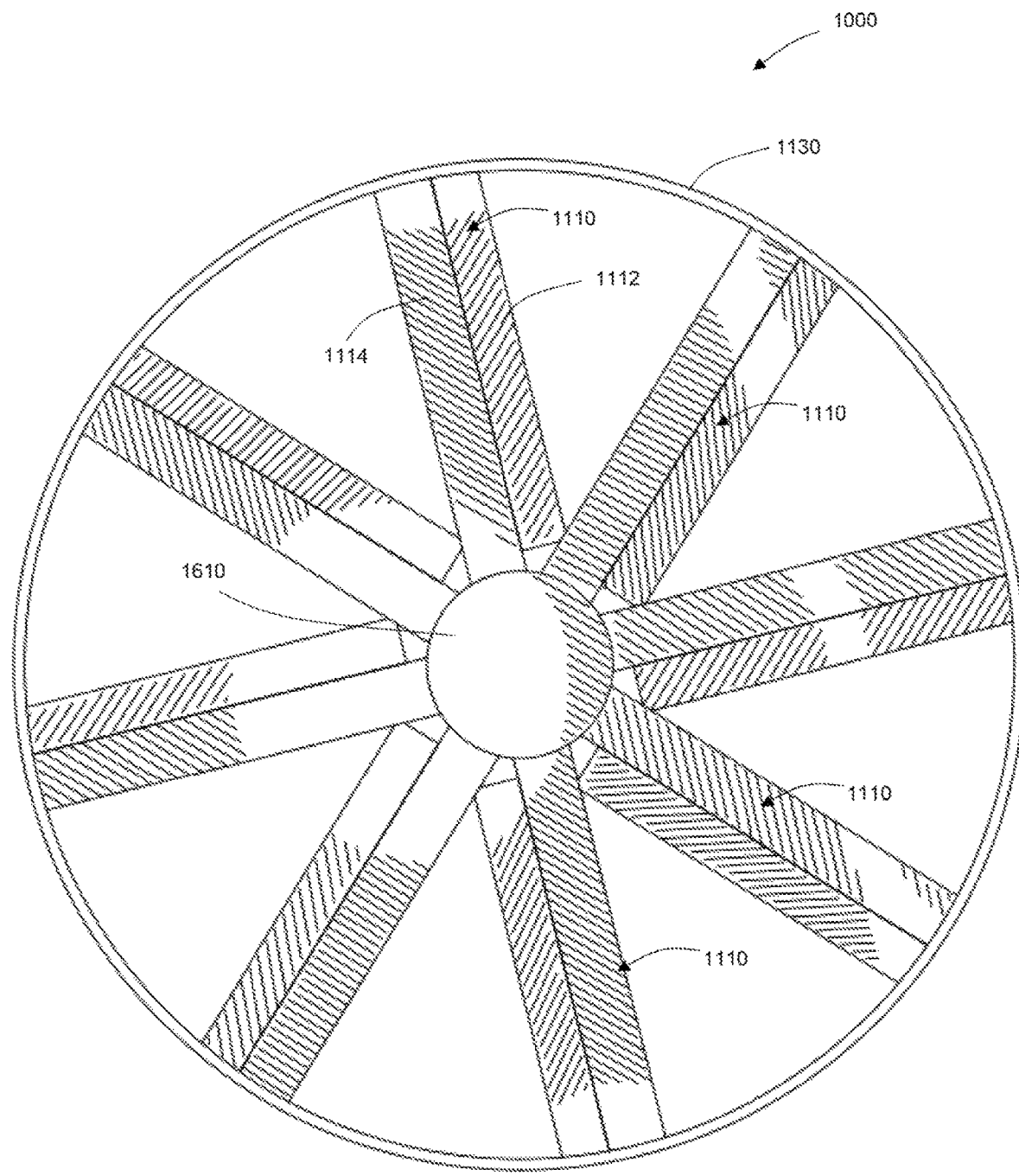
FIG. 20 shows a top view of a seventh embodiment of an aerially distributable communications device.
Figure 21:
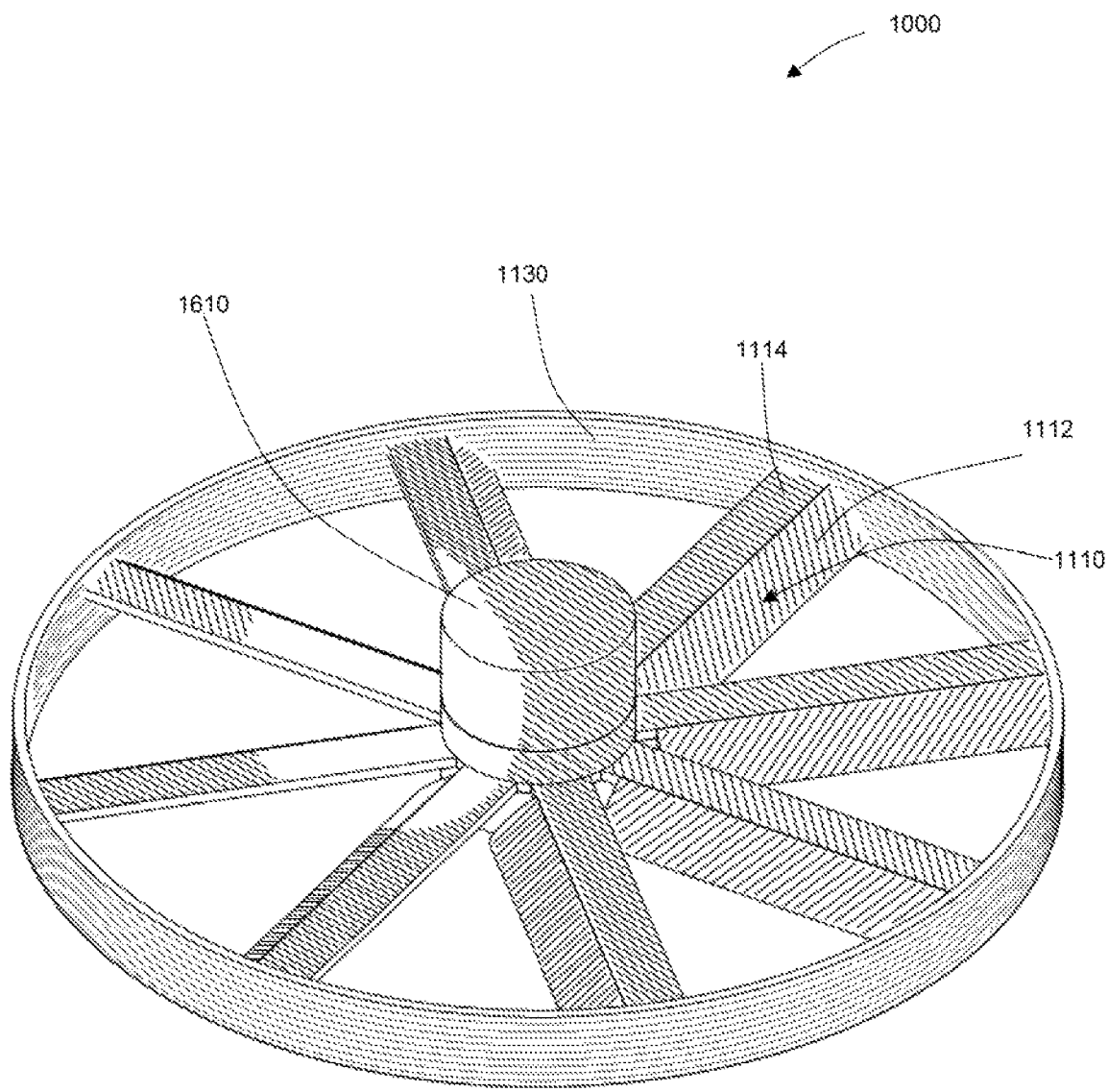
FIG. 21 shows a top perspective view of the aerially distributable communications device of FIG. 20.

Another embodiment is shown in FIGS. 20 and 21. In this embodiment, the cylindrical formation does not include an annular flange, and instead only presents a hollow formation in the form of a cylindrical wall. The blades are the same as the blades shown in FIG. 4, and are fixed to the cylindrical formation and the hub.

FIGS. 22 to 25 show an embodiment of an aerially distributable communications device 1000 that includes foldable blades 1102. The profile of the blades 1102 are similar to the blades shown in FIG. 4, however a pivoting mechanism is provided in the form of hinge 1104 including pivot pin 1106. The blades 1102 are movable between a folded position and deployed position. In another embodiment (not shown) the pivoting mechanism may be spring loaded, including an over centre spring mechanism to hold the blade in either its folded position or deployed position, once it has been manually moved into either of the positions.

A supporting flange 1107 extends from the hub 1610 to support the foldable blade 1102 when it is in the deployed position, in order to prevent it from pivoting further upwardly, for example by forces applied to the blade 1102 by airflow when it is in flight. The pivot pin 1106 of the hinge 1104 is slidably movable in slot 1108 in the blade 1102. By sliding the pivot pin 1106 through slot 1108 when the blade 1102 is in its folded position, the height of the aerially distributable communications device 1000 can be reduced during transport and/or storage. In order to deploy the aerially distributable communications device 1000, the pivot pin will be moved to the top of the slot, and the blade 1102 folded over into a horizontal position. The blade 1102 will then be inserted into the receiving slot 1612 in the hub 1610. The blade 1102 includes a snap fit connecting formation 1109. As the pointed end of blade 1102 is inserted into receiving slot 1612, the snap fit connecting formation 1109 engages securely with complementary snap fit connecting formation (not shown) within receiving slot 1612. It will be appreciated by those skilled in the art that a large variety of other connecting arrangements could be used in alternative embodiments (not shown) for connecting of the blade to the hub. For example, alternative connecting arrangements could include spigot and socket type arrangements utilising friction or interference fit to secure the blade to the hub, bayonet type connecting arrangements, locking pin type arrangements, for example including a spring loaded locking pin is receivable into a recess; and a wide variety of other connecting arrangements.

Figure 22:
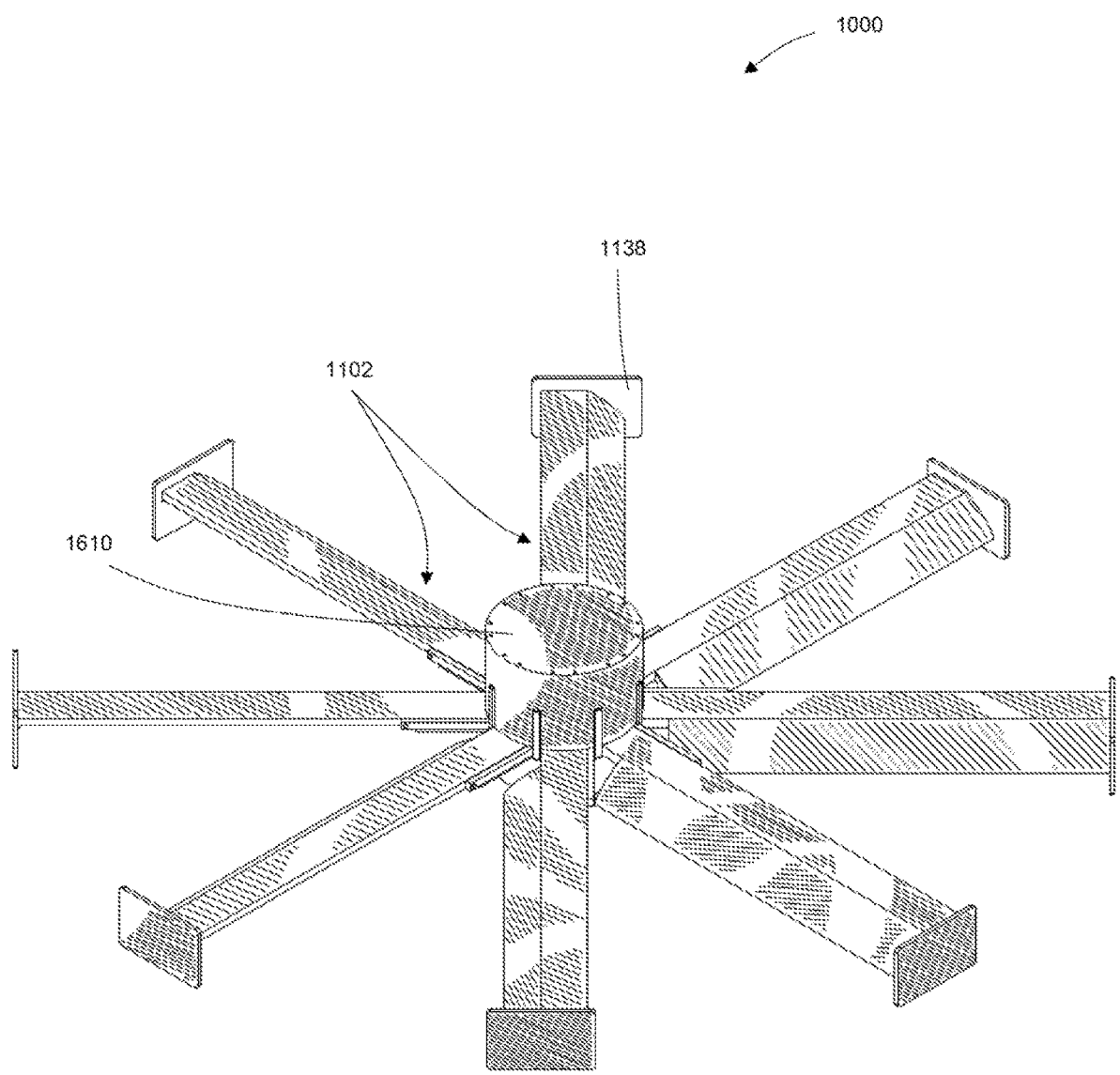
FIG. 22 shows a top perspective view of an eight embodiment of an aerially distributable communications device.
Figure 23:
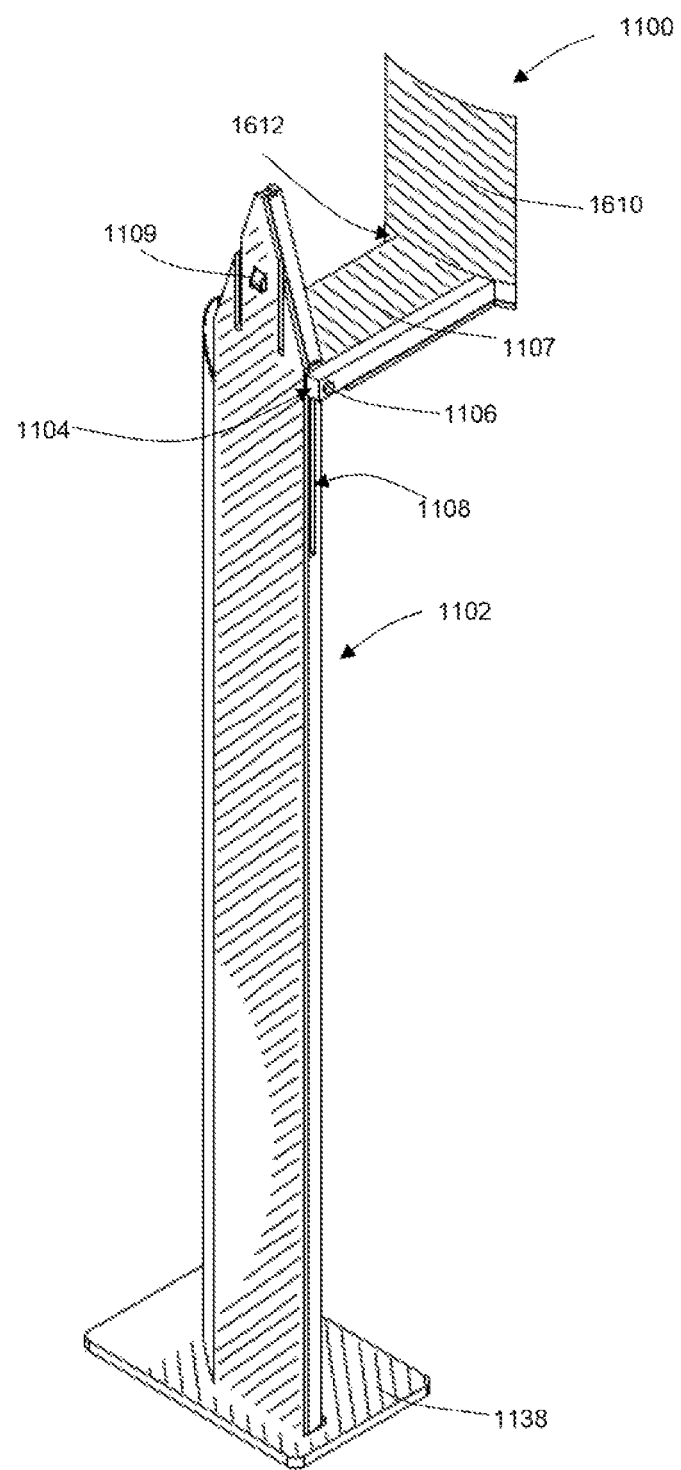
FIG. 23 shows a close-up cutaway view of a blade and hub of an aerially distributable communications device of FIG. 22.
Figure 24:
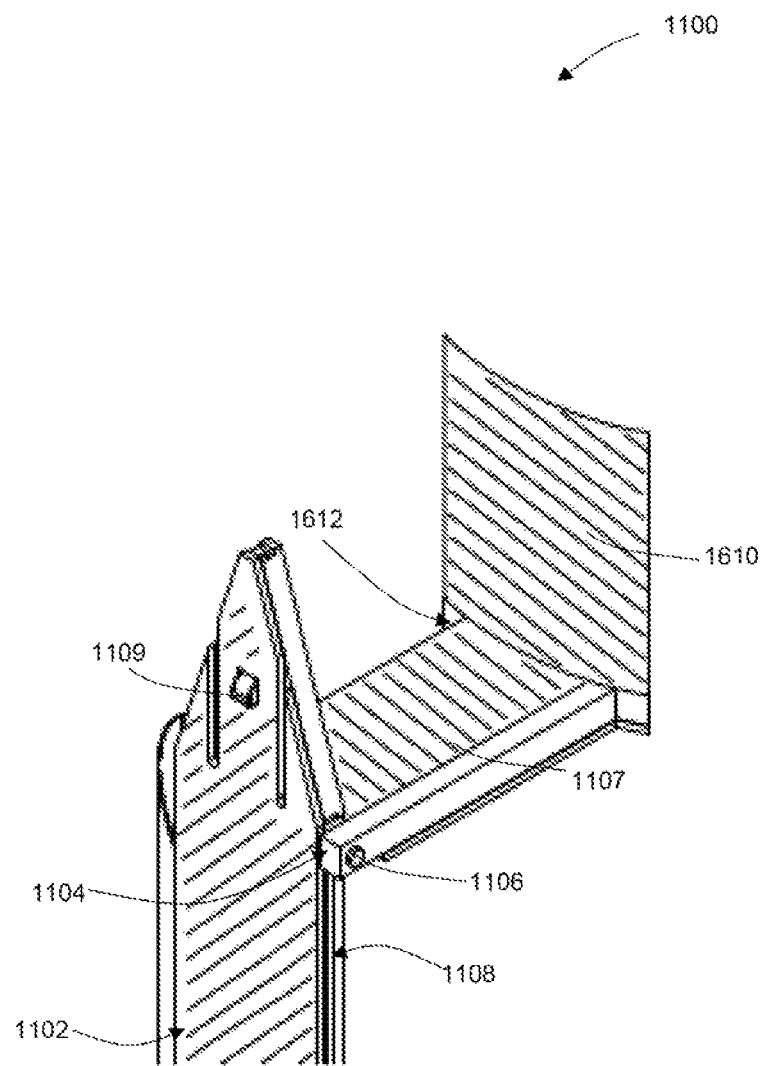
FIG. 24 shows a closer cutaway view of FIG. 23.
Figure 25:
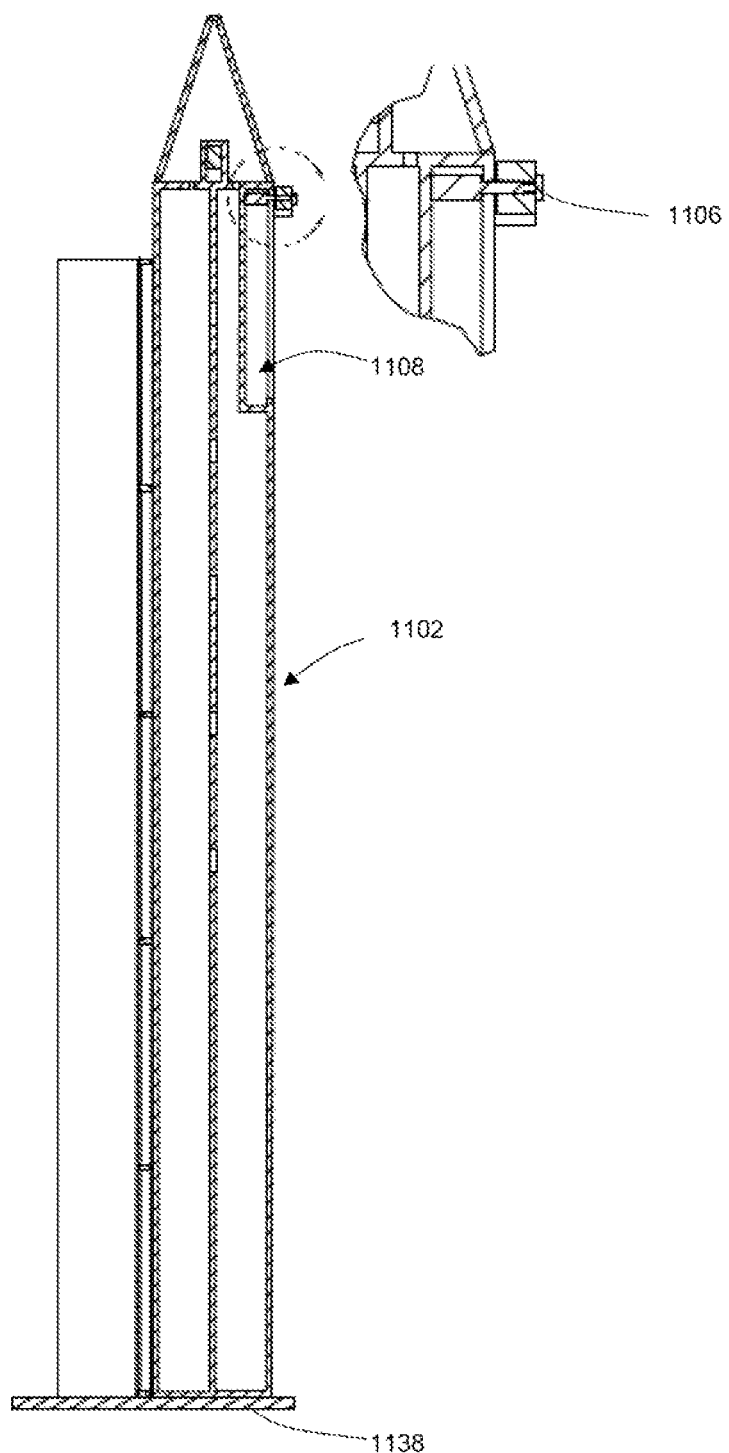
FIG. 25 shows a cutaway cross-sectional top view of the blade of FIG. 22.

FIG. 22 shows the aerially distributable communications device 1000 with the blades 1102 inserted into receiving slots 1612 in their deployed position. FIG. 23 shows the blades 1102 in their folded position, with the pivot pin 1106 at the top of slot 1108.

It is further envisaged that in another embodiment (not shown) a spring loaded locking pin can be provided that may be receivable into a recess associated with the hub 1610 in order to lock the foldable blade 1102 in its deployed position, and to prevent it from folding back to its folded position.

In the embodiment shown in FIGS. 22-25, the hollow formation is segmented into separate fins 1138 located at the end of each of the blades 1102. The fins 1138 of this embodiment are shown as being planar, however in alternative embodiments as will be described below, the fins can be aerofoil shaped in order to streamline the movement of the blades 1102 through the air.

Figure 26:
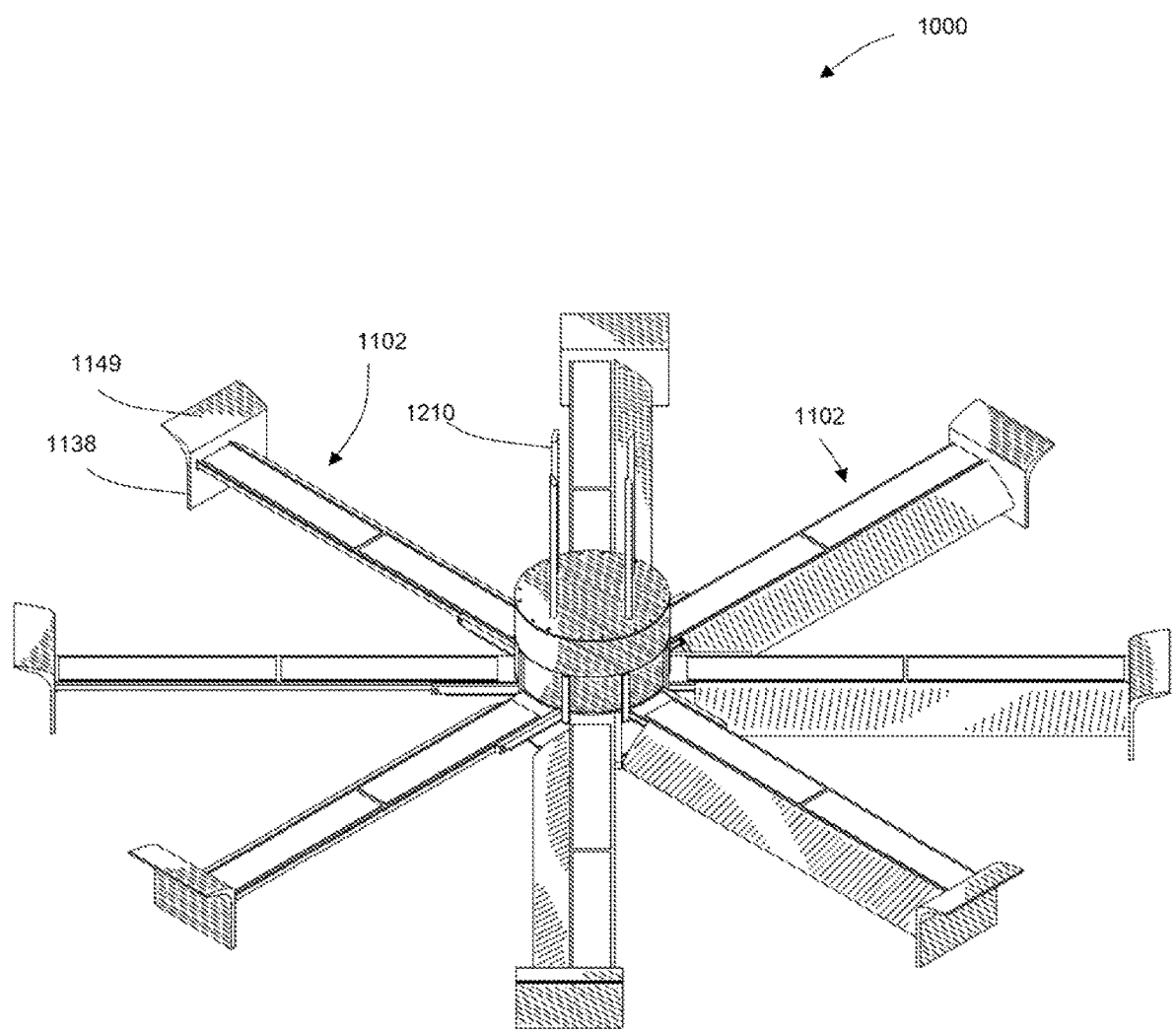
FIG. 26 shows a top perspective view of a ninth embodiment of an aerially distributable communications device.

Another embodiment is shown in FIG. 26, wherein the hollow formation is segmented into separate fins 1138, however the fins 1138 in this instance include an outwardly extending segmented flange 1149 at an upper edge, the segmented flanges 1149 of all of the blades 1102 making up a segmented annular flange as described above.

In the embodiment shown in FIG. 26, an upwardly extending antenna 1210 is shown extending from the hub 1610.

Figure 27:
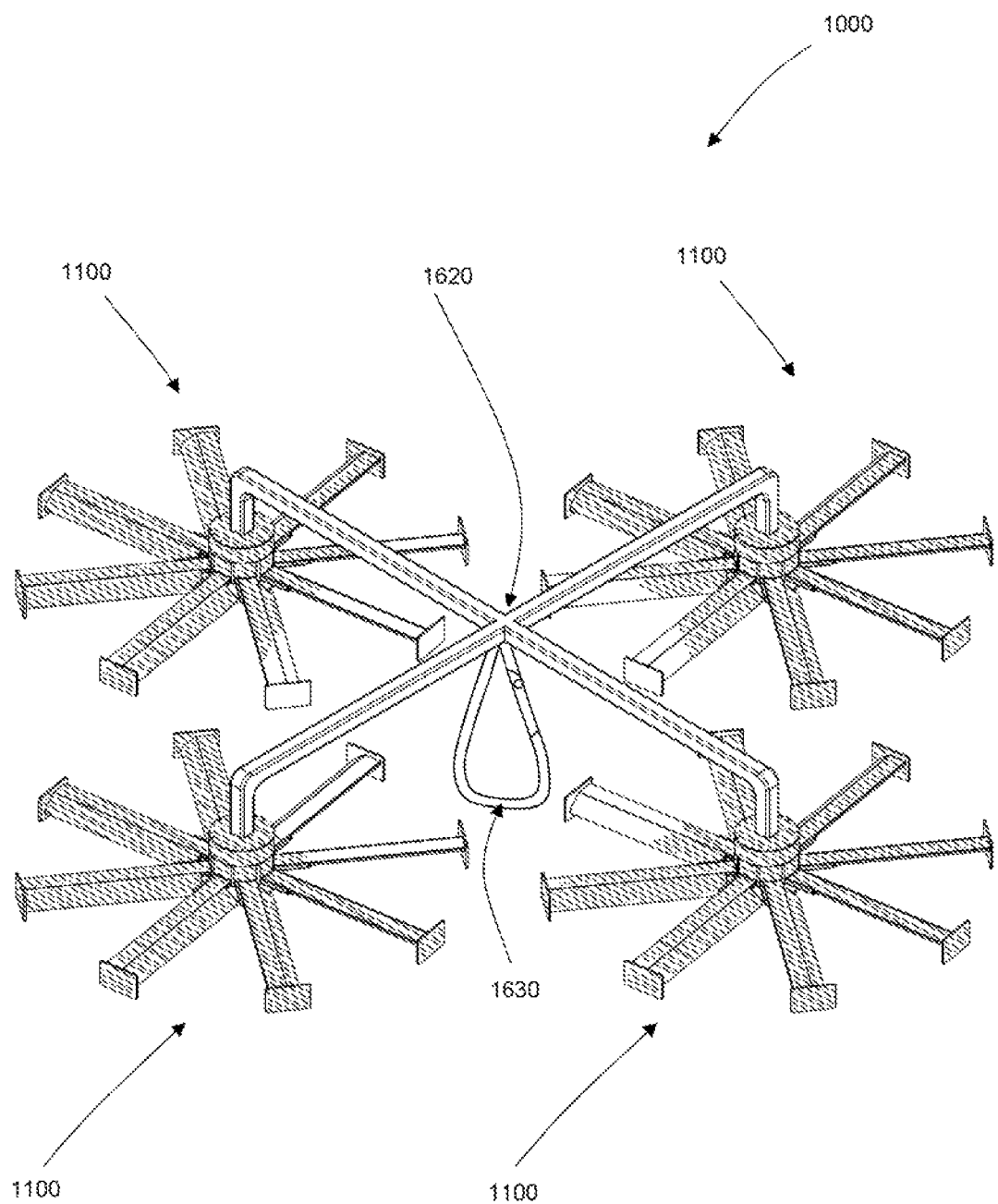
FIG. 27 shows a top perspective view of a tenth embodiment of an aerially distributable communications device.

Another embodiment of an aerially distributable communications device 1000 is shown in FIG. 27. In this embodiment, the plurality of gyrochutes 1100 are provided. The gyrochutes are connected together by a frame 1620. The frame includes supporting formations 1630 on which a large payload may be supported. In the embodiment shown in FIG. 27, the support information is in the form of a large carabiner type clip, however it will be appreciated by person skilled in the art that a wide variety of supporting formations 1630 may be used. In this embodiment, it is envisaged that the blades 1102 will be freely rotating about hubs 1610.

Figure 28:
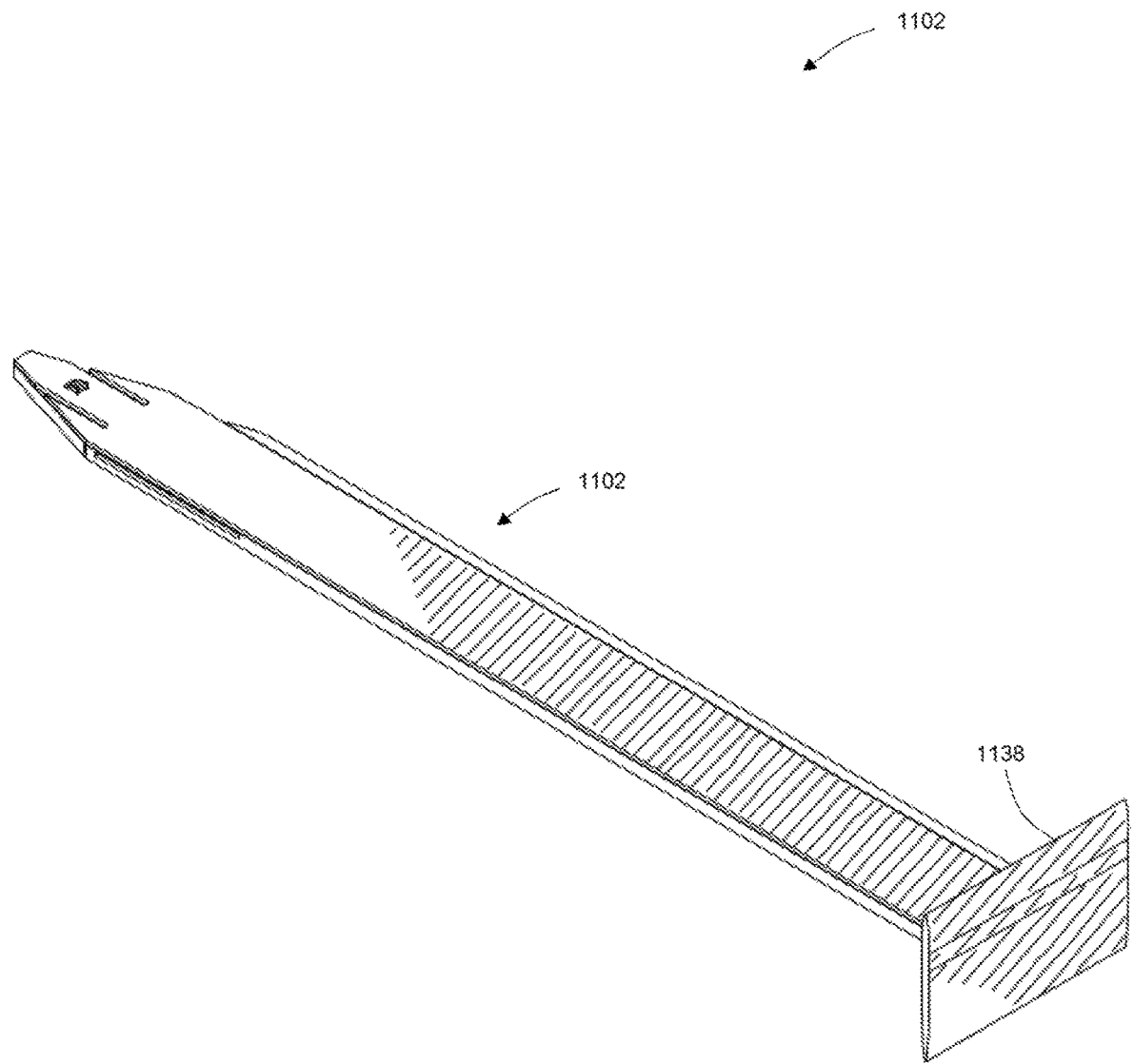
FIG. 28 shows a top perspective view of a foldable blade and a fin having a aerofoil cross-section streamlined in the vertical direction.
Figure 29:
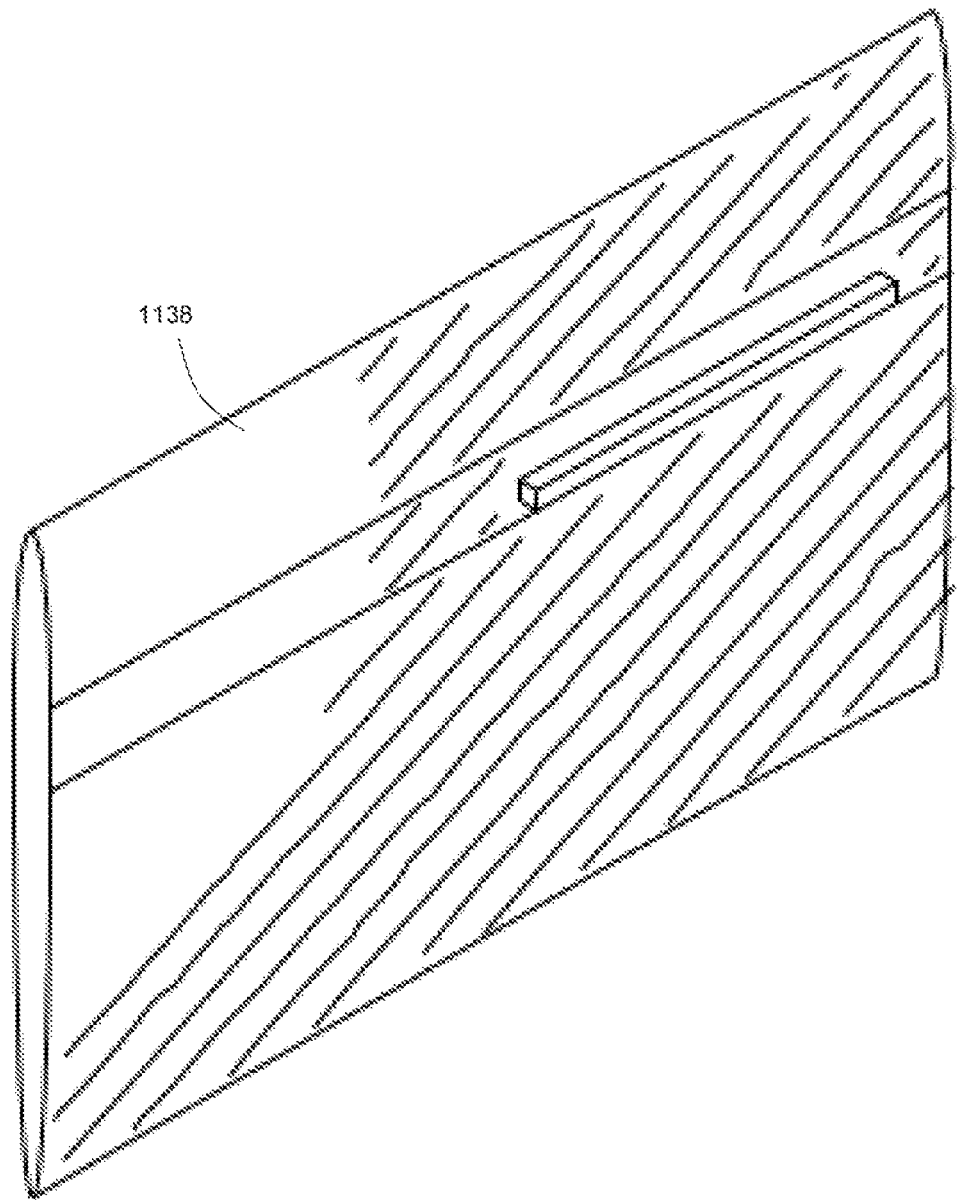
FIG. 29 shows a top perspective view of the fin of FIG. 28.

As discussed above, another embodiment of a blade 1102 is shown in FIG. 28. In this embodiment, the fin 1138 is shown as aerofoil shaped in cross-section. In this embodiment, the aerofoil is streamlined in the vertical direction. A close up of the fin 1138 shown in FIG. 28 is shown in FIG. 29, illustrating the streamlining in the vertical direction.

Figure 30:
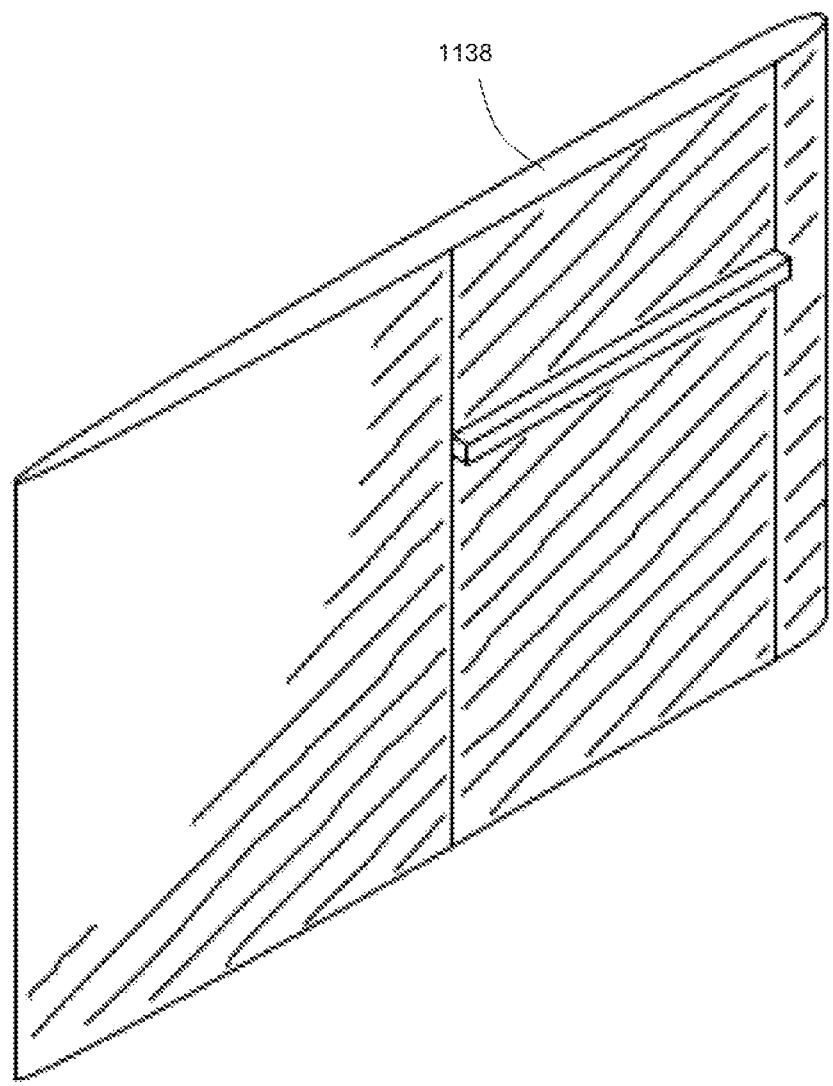
FIG. 30 shows a top perspective view of a fin having an aerofoil cross-section streamlined in the horizontal direction.

Another embodiment of a fin 1138 is shown in FIG. 30, showing the aerofoil shape being streamlined for movement in the horizontal or rotational direction.

It is further envisaged that the fins 1138 may be removably connectable to the blades 1102, for example by means of a snap fit type connection. It will be appreciated by person skilled in the art that a wide variety of connecting arrangements could be used to connect a fin to a blade.

Communications Module

Now described with reference to FIG. 15, a communications module 1200 is provided. The communications module 1200 is preferably located in the hub 1610, however it is also envisaged that it could be slung underneath and/or above the gyrochute 1100. The communications module 1200 includes a computer processing unit (CPU) or processor 1220 and digital storage memory 1230 configured for storing data and/or software instructions. It is envisaged that the communications module 1200 may be provided as a system on a chip (SOC), or could be provided on any combination of circuitry boards 1205. Such secondary boards may be provided with secondary support componentry (not shown) such as read-only memory (ROM), random access memory (RAM), and other known requirements for the circuitry to operate.

In a preferred embodiment, the processor 1220 and digital storage memory 1230 can also be configured for and function as the controller 1190 for the gyrochute 1100. In an alternative embodiment, it is envisaged that a separate controller 1190 may be provided.

Further, software stored on the digital storage memory 1230 preferably includes software modules for controlling operation of the communications module 1200, which may access stored software libraries such as .dll libraries for use by the various software modules.

The communications module 1200 further includes preferably a plurality of transceivers in the form of communications chips and associated antennas as will be described below. The communications chips and their associated antennas are preferably configured for both low-power/low range wireless communications, as well as relatively higher power/longer range wireless communications.

Figure 15:
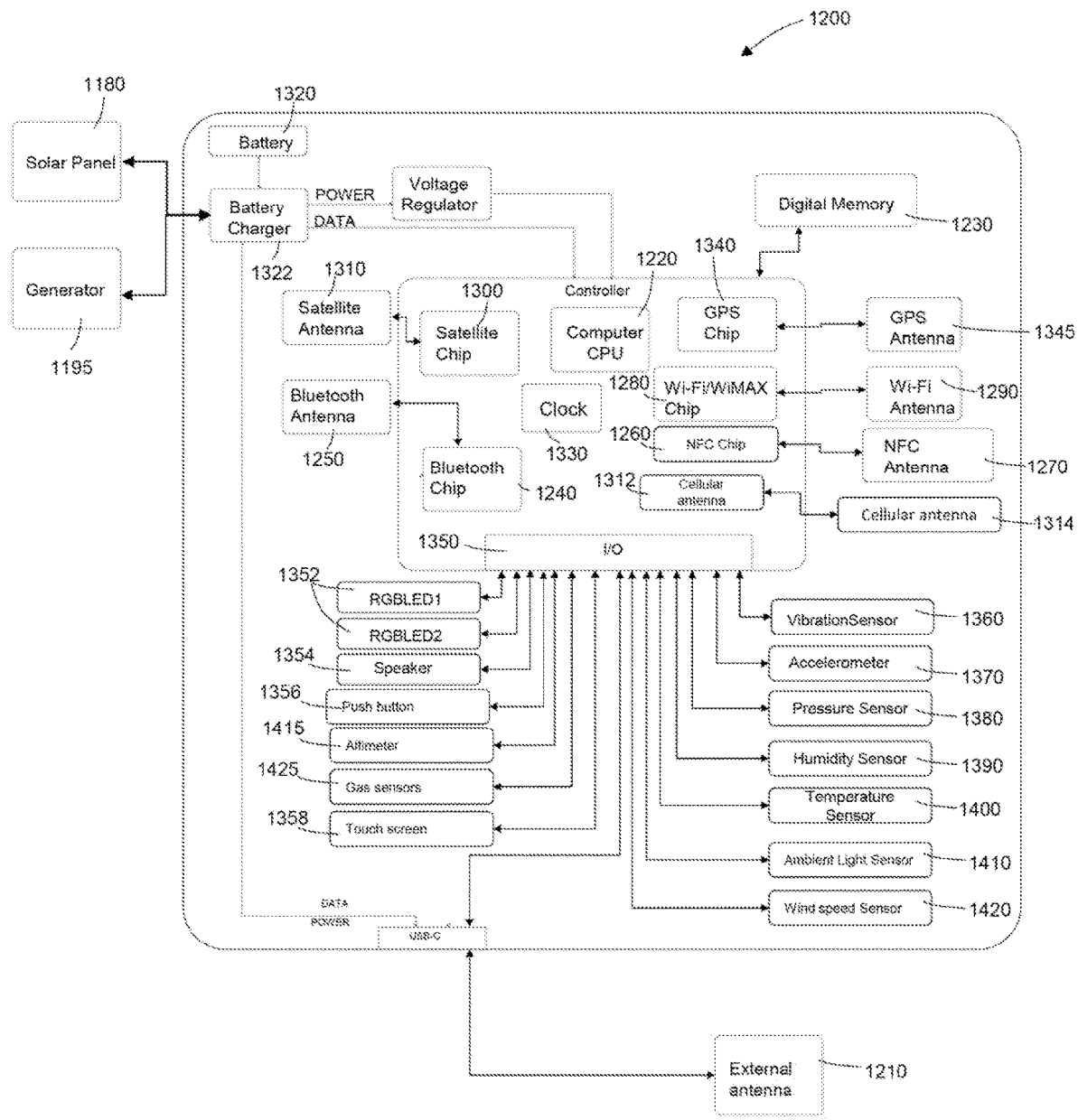
FIG. 15 shows a schematic view of a communications module.

In the embodiment shown in FIG. 15, the communications module 1200 includes a Bluetooth™ enabled chip 1240 and associated Bluetooth™ antenna 1250 for low-power, low range communication with other similar communications modules 1200, as well as for communication with communication devices of users on the ground after it is deployed.

In addition, the communications module 1200 includes a near field communication (NFC) read/write chip 1260 and associated NFC antenna 1270. It is envisaged that the NFC read chip 1260 and associated NFC antenna 1270 will also be used for close range, low power communication with mobile phones of users on the ground.

Further, the communications module 1200 includes a Wi-Fi/WiMax enabled chip 1280 and associated Wi-Fi/WiMax antenna 1290 for medium to longer range communications, at relatively higher power.

Lastly, it is envisaged that the communications module 1200 can include very long range (and generally higher power) communications chips for communication over longer ranges using protocols such as satellite communications protocols, or cellular communications protocols such as 3G, 4G, LTE, 5G, or the like. In this regard, the communications module 1200 shown in FIG. 15 includes a satellite communications chip 1300 and associated antenna 1310, enabling it to communicate directly with satellites 2200 using known protocols. In addition, the communications module 1200 includes a cellular communications chip 1312 and associated cellular communications antenna 1314 for communication with, for example, cellular communication towers 2300 that may still be in operation.

It will be appreciated that many alternative protocols may be possible which can offer a wide variety of communication types, ranging from text only (in order to conserve power usage), SMS and MMS, to voice over IP (VOIP), sending of pictures or photos, to video calls (although this is not preferred as it is power hungry).

It is envisaged that most aerially distributable communications devices 1000 will not be provided with a satellite communications chip 1300 and associated antenna 1310. However, it is envisaged that a large number of aerially distributable communications devices 1000 may be provided, which will set up a communication network 2000 as will be described in more detail below.

A relatively small proportion of the aerially distributable communications devices 1000 will preferably be configured as a gateway communications device 2100 operable as a gateway node in the communications network 2000, enabling long-range communications from users phones via the communications network to a distant antenna and/or satellite. It is envisaged that an aerially distributable communications device 1000 having the functionality to operate as a gateway communications device will also be provided with increased power storage and charging abilities, as such long-range communications are expected to require increased power usage.

In an alternative embodiment, it is envisaged that a dedicated gateway node, such as a preferably generator powered gateway communication device 2105, preferably with its own mast antenna, may be set up for communication with the communication network 2000 utilising a plurality of aerially distributable communications devices 1000 as nodes of the communication network 2000.

The communications module 1200 further includes a power source in the form of a battery 1320. The battery 1320 is preferably configured to be charged by the solar panel and/or generator 1195 via battery charger 1322.

The communications module 1200 further includes a clock device 1330 on which time can be set and measured. The clock device is used for time stamping any communications moving through the communications module 1200.

The communications module 1200 further includes a GPS chip 1340 and associated GPS antenna 1345. It is envisaged that the processor 1220 may be configured by software stored on the digital storage media 1230 to act as a geo-positioning device, using signals received from geo-positioning satellites to determine the location of the aerially distributable communications device 1000.

The communications module 1200 further includes an input/output interface 1350, to which external devices can be connected. Examples of such external devices include output devices such as visual indicator than the form of LED lights 1352, audio indicators in the form of a speaker or buzzer 1354, and input devices such as a pushbutton 1356 and/or touchscreen 1358.

Also connected via the input/output interface 1350 may be an array of sensors. The sensors can include vibration sensors 1360, one or more accelerometers 1370, pressure sensors 1380, humidity sensors 1390, temperature sensors 1400, (preferably ambient) light sensors 1410, an altimeter 1415, wind speed sensors 1420 and an array of gas sensors 1425, such as a carbon dioxide sensor, oxygen sensor, nitrogen sensor, and methane sensor.

Also envisaged but not shown are sound sensors; proximity sensors; gyroscopes; infrared sensors; ultrasonic sensors; smoke sensors; alcohol sensors; touch sensors; colour sensor; tilt sensor; flow sensors; level sensors; or the like.

The sensors need not be physically connected to the aerially distributable communications devices 1000, and may be configured to be distributed by the aerially distributable communications devices 1000 on deployment. The sensors could be launched from the aerially distributable communications device 1000 at a set height detected by an altimeter, or on landing. The sensors could be launched away from the aerially distributable communications device 1000 by being spring loaded, or by using the rotating action of the aerially distributable communications device 1000 during deployment to generate centripetal forces to push the sensors away. In this regard it is envisaged that the sensors may be attached to the annular flange, or to an external surface of the cylindrical formation.

It is envisaged that the sensors will be able to provide feedback to the outside world of conditions on the ground in the area. In addition, the sensors can be used by the processor 1220 in order to perform a wide variety of useful functions such as, for example, initiating the production of clean water using the dehumidifier and/or water purification device, or monitoring weather and/or geological events using the wide array of sensors.

In addition, it is envisaged that the aerially distributable communications device 1000 can include an ultrasound emitter (not shown) to attract or repel creatures. Further, the aerially distributable communications device 1000 can be provided with ultrasonic vibrators to remove dust and dirt from solar panels or to otherwise keep its componentry clean. It is further envisaged that a secondary active or passive deceleration device (not shown) may be provided, such as a small rocket or jet engine or parachute, for facilitating the soft landing of the aerially distributable communications device 1000.

In Use

It is envisaged that, on establishing that there is a requirement for communications to be set up in an area where communications is not currently available, a plurality of aerially distributable communications devices 1000 will be loaded on board an aircraft (not shown). The aircraft will then be flown over the affected region, and the aerially distributable communications devices 1000 will be deployed from the aircraft. It is envisaged that, depending on the size of the aerially distributable communications devices 1000, may be deployed from the aircraft in a spinning horizontally aligned condition, in order to facilitate autorotation, and in order to facilitate stability of the aerially distributable communications device 1000 in flight.

Alternatively, it is envisaged that the aerially distributable communications devices 1000 can be deployed from a much higher level craft such as a spacecraft or satellite (not shown). In order to facilitate the deployment from high altitudes, is envisaged that the aerially distributable communications devices can include a heat shield 1500 to shield it from heat generated from friction during re-entry into an atmosphere. The heat shield 1500 is preferably covered at least on its downward facing surfaces 1510 (in use) with heat resistant materials, such as ceramic tiles, or the like. Once the speed of re-entry has sufficiently slowed from the increased density of the atmosphere, the heat shield may be released, allowing the gyrochute 1100 to slow the descent.

Figure 17:
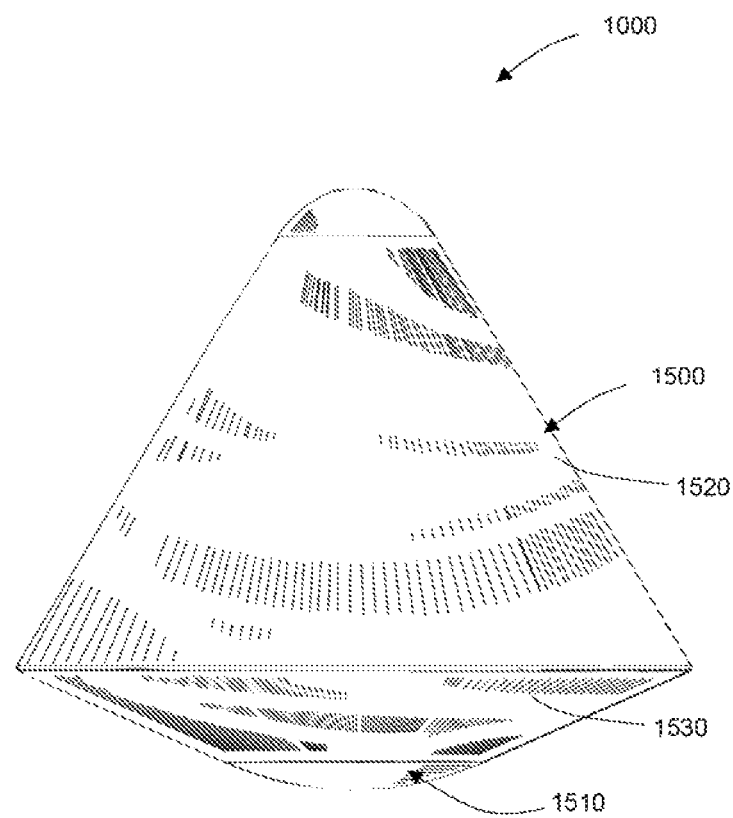
FIG. 17 shows a side elevation view of a sixth embodiment of an aerially distributable communications device in a heat shield.
Figure 18:
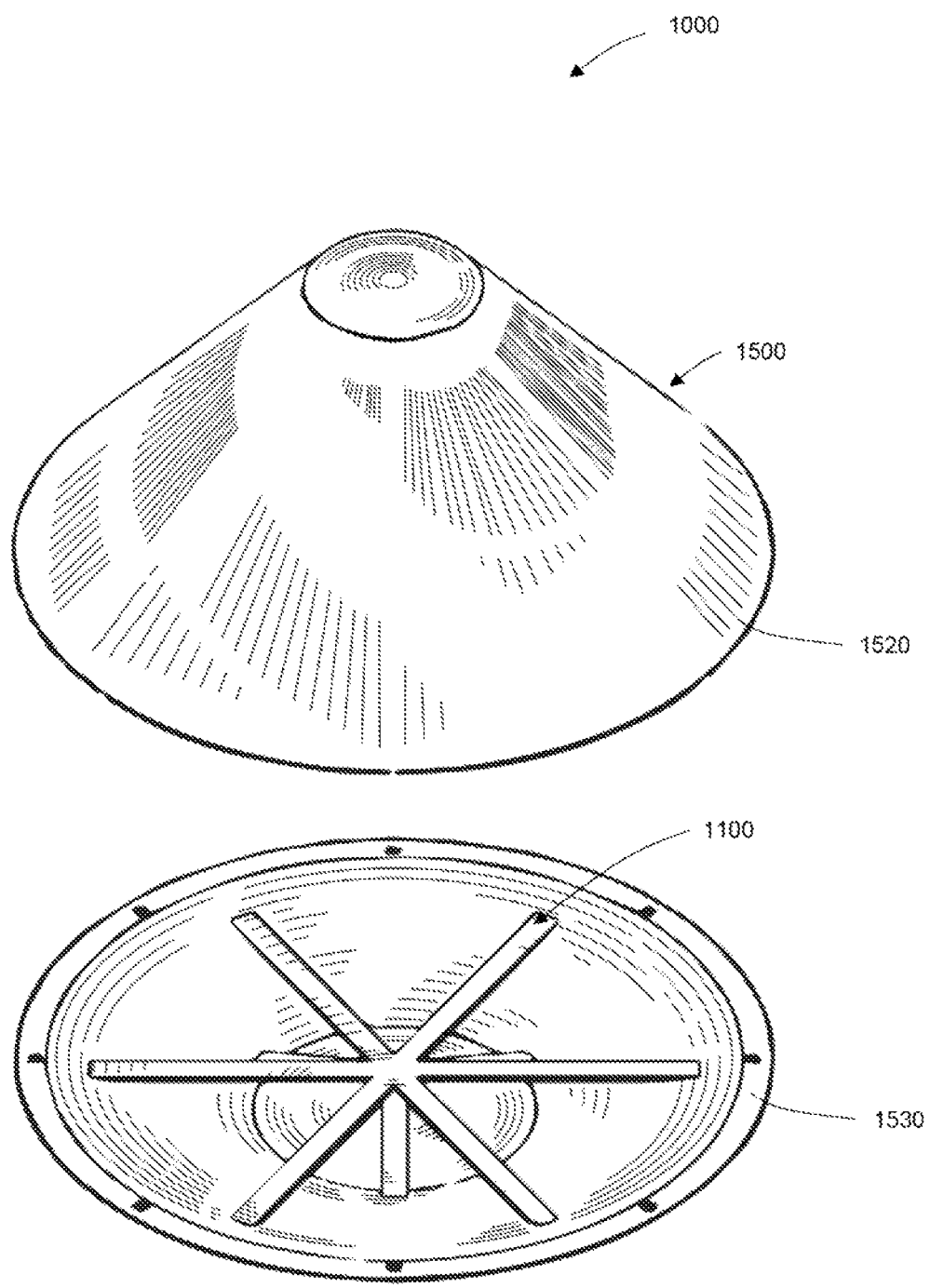
FIG. 18 shows a top perspective exploded view of the aerially distributable communications device in a heat shield of FIG. 17.

In the embodiment shown in FIGS. 17 and 18, the heat shield comprises an upper portion 1520 and a lower portion 1530 that together preferably enclose the gyrochute 1100 and communications module 1200. It is envisaged that the upper portion 1520 will be separable from the lower portion 1530, and preferably will fall away after insulating the gyrochute 1100 and communications module 1200 during re-entry. In order to separate the upper portion 1520 and lower portion 1530, it is envisaged that they may be held together preferably internally by a fastening arrangement, for example by a threaded fastener or similar, and an electrical motor (not shown) may be used to turn the threaded fastener to decouple the upper portion 1520 from the lower portion 1530. The electrical motor used to decouple the portions of the heat shield may be actuated by the processor 1220 acting as a controller, or may be provided with its own controller, which may in turn be guided by instructions for receiving information from sensors. This information received from the sensors may be indicative of the correct altitude and/or speed and/or acceleration and/or windspeed at which the heat shield 1500 is to be dispensed with.

In an alternative embodiment (not shown) the fastening arrangement may be provided externally. However this is not preferred as the heat of re-entry may affect the operation of the fastening arrangement.

Figure 19:
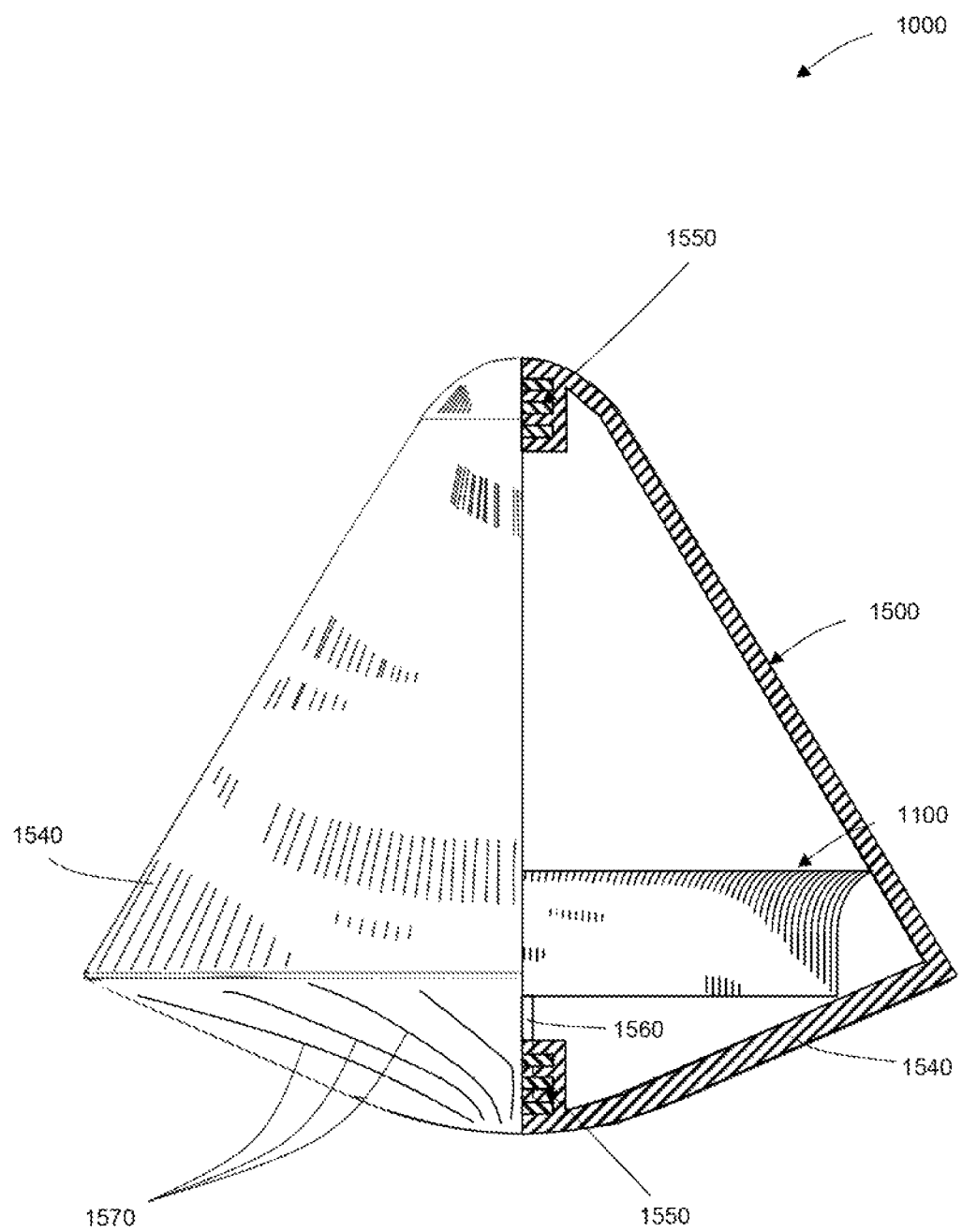
FIG. 19 shows a side elevation cutaway view of a seventh embodiment of an aerially distributable communications device in a heat shield.

In an alternative embodiment (not shown), any number of portions or pieces may be used to enclose the gyrochute and communications module. The portions need not necessarily be upper or lower portions, and could be a plurality of side portions that enclose the gyrochute and communications module from the side, as shown in FIG. 19. However a dedicated lower portion is preferred as this allows for the thermal integrity of the underside to be maintained.

Alternatively, it is and/or additionally, it is envisaged that a wide variety of mechanisms could be used to separate the heat shield portions from each other to cause them to fall away from the gyrochute and communications module. For example, a small explosive device could be used to decouple the portions of the heat shield. However this is not preferred as it may cause damage to the communications module.

In the embodiment shown in FIG. 19, the heat shield includes a pair of side portions 1540 that are engageable with each other at a labyrinth seal 1550 extending around the engaging outer periphery of the side portions. The fastening arrangement includes a locking pin 1560 receivable within apertures (not shown) through the labyrinth seals. The locking pin is preferably connected to an electrical motor that is actuated by the controller to remove the locking pin. The lower surface of the heat shield is configured with aerodynamic formations 1570 configured for inducing autorotation. Once the correct altitude has been reached, it is envisaged that the controller will actuate a solenoid (not shown) to remove the locking pin from the apertures, and the centrifugal forces generated by autorotation will cause the side portions to move apart from each other and be flung outwardly and away from the gyrochute.

In the embodiment shown in FIG. 19, the heat shield is configured with aerodynamic formations 1570 in the form of ridges on its lower surface in the extending from the centre transverse to the radial direction on the underside of the lower portion of the heat shield, in order to induce autorotation. Once autorotation has been established, then on being decoupled, the gyroscopic forces caused by the autorotation of the heat shield would urge the portions of the heat shield outwardly and away from the gyrochute and communications module. In addition, the gyrochute would already be spinning once the heat shield is released, and would be generating better lift forces than if it was starting from a non-rotating condition.

It is further envisaged that a fastener holding the plurality of portions of the heat shield together can be a frangible fastener (not shown) that is designed to break if autorotation has been induced and the gyroscopic forces are strong enough to reach a predetermined threshold limit.

The aerially distributable communications devices 1000 can be guided to move towards a predetermined area or zone, either by controlling the control surfaces of the gyrochute 1100 to steer the aerially distributable communications device 1000, or by having the aerially distributable communications device 1000 steer itself using the controller, towards areas or zones that have been pre-input for each aerially distributable communications device 1000. It is envisaged that where the controller is used to steer the aerially distributable communications device 1000, the GPS chip can be used to provide geolocation data to determine the correct landing site.

Alternatively, sufficient numbers of aerially distributable communications devices 1000 can be deployed to ensure density of coverage over a predetermined area, without guiding of the aerially distributable communications device 1000 to a predetermined or designated area. Since it is envisaged that the aerially distributable communications devices 1000 will be recovered by people on the ground, and taken to areas of higher density population, this method is preferred.

On landing at the designated area or zone, the generator 1195 can be coupled to the rotating blade set 1160, either by controlling of the coupling remotely via the controller, or by automatic actuation by impact on landing.

As the aerially distributable communications device 1000 approaches the landing zone, it is envisaged that the controller can cause audible and visual alert signals to be issued. Alternatively, the whistle that is actuated by airflow during the descent will make a noise, alerting people to the falling device 1000.

After deployment, the communications module 1200 is configured for connecting with other similar aerially distributable communications devices 1000 in a locally located communications network 2000, as well as to connect with a gateway communication device 2100 that is preferably able to communicate to the outside world, thereby enabling important communications for management of, for example, natural disasters. The communications network 2000 can have a network topology that may be a mesh topology network; a point-to-point network; a point to multipoint network; a star topology network; and any other suitable topology network.

It is envisaged that each aerially distributable communications device 1000 will be able to cover an area of between 0.5 km$^2$ and 1,500,000 km$^2$, depending on factors such as terrain, foliage and environmental conditions, as well as the radio technology being used.

Figure 16:
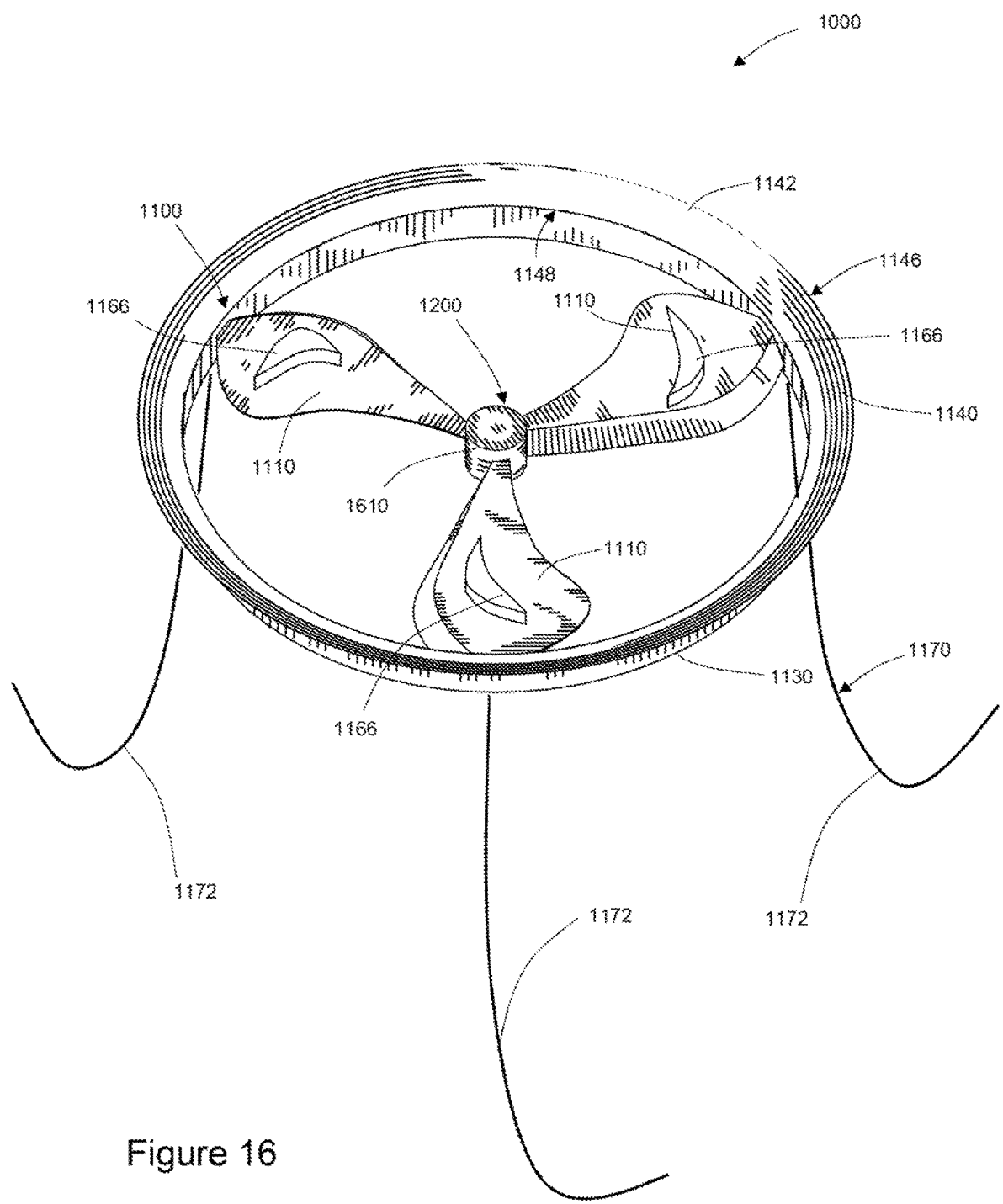
FIG. 16 shows a top perspective view of the fifth embodiment of an aerially distributable communications device of FIG. 14.

As shown in FIGS. 14 and 16, it is further envisaged that a rotating blade set such as the pivoting lift inducing blade set 1160 can be configured with extension portions 1166 to be driven by wind once the aerially distributable communications device 1000 has been deployed and has landed on the ground. The blade set 1160 can be coupled to a generator 1195 so that, as it is turned by the wind, it will generate electricity for recharging the battery. It is envisaged that the blade set 1160 can be selectively coupled to the generator 1195, so that it is only coupled to the generator 1195 on landing. It is envisaged that coupling can be actuated either remotely via the controller, or alternatively the impact of landing could be used to actuate coupling of the blade set to the generator.

Preferably the leg structures 1170 will dampen the impact on landing where the impact is not required to actuate the coupling of the blade set to the generator. Further, the leg structures 1170 will serve to elevate the communications module 1200 for better coverage.

On landing, the communications modules 1200 will set up communications with the communications modules 1200 of nearby aerially distributed to indications devices 1000. The communication modules 1200 will each become a node in a distributed mesh network. In this configuration, any information transmitted by one of the communication modules 1200 will be received by adjacent communication modules and transmitted on through the communication network 2000 until information is received by a gateway communication device 2100 (shown in FIG. 11). Each of the communications that are received and/or transmitted preferably time stamped. Further, each of the communications that are received and/or transmitted can be stored either persistently or temporarily on the digital storage media 1230, until the information is able to be transmitted. The gateway communication device 2100 can be one or more of the aerially distributable communications devices 1000, or can be set up as a purpose-built gateway communication device, for example with a large mast antenna allowing for communication over wide area networks, and preferably including its own relatively high power sources such as a generator or mains power supply (if available). Such a purpose built gateway communications device may be ground, sea or air based.

Users on the ground with communications devices such as mobile phones will be able to connect to the transceivers of the communications module 1200, either through NFC, Bluetooth, or Wi-Fi, setting up a communications infrastructure for communicating information to the gateway device 2100. From the gateway communication device 2100, the information can be transmitted to and/or received from the outside world.

Interpretation

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

The terminology used herein is for the purpose of describing particular embodiments only and is not intended to be limiting of the invention. As used herein, the singular articles "a", "an" and "the" are intended to include the plural forms as well, unless the context clearly indicates otherwise and thus are used herein to refer to one or to more than one (i.e. to "at least one") of the grammatical object of the article. By way of example, the phrase "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The term "real-time" for example "displaying real-time data," refers to the display of the data without intentional delay, given the processing limitations of the system and the time required to accurately measure the data.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Composite Items

As described herein, 'a computer implemented method' should not necessarily be inferred as being performed by a single computing device such that the steps of the method may be performed by more than one cooperating computing devices.

Similarly objects as used herein such as 'web server', 'server', 'client computing device', 'computer readable medium' and the like should not necessarily be construed as being a single object, and may be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

Database:

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Markush Groups

In addition, where features or aspects of the invention are described in terms of Markush groups, those skilled in the art will recognise that the invention is also thereby described in terms of any individual member or subgroup of members of the Markush group.

Chronological Sequence

For the purpose of this specification, where method steps are described in sequence, the sequence does not necessarily mean that the steps are to be carried out in chronological order in that sequence, unless there is no other logical manner of interpreting the sequence.

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, The aerially distributable communications device as claimed in claim 1, wherein performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

For the purposes of this specification, the term "plastic" shall be construed to mean a general term for a wide range of synthetic or semisynthetic polymerization products, and generally consisting of a hydrocarbon-based polymer.

For the purposes of this specification, any reference to the term "pitch" of an aerofoil in a gyrochute shall be construed to be the angle between the chord of an aerofoil and the horizontal when the gyrochute is in stable flight.

For the purpose of this specification, the term "horizontal" in reference to the direction of any features of the aerially distributable communications device shall be construed to refer to the direction relative to the aerially distributed communications device when it is in equilibrium and/or stable flight, unless otherwise specified, or the context makes it clear that this is not the case.

For the purposes of this specification, the term "gyrochute" shall be construed to include a gyrochute, rotary chute, unpowered autogyro and any other aircraft that includes unpowered blades that automatically generates lift force to slow their descent on falling through the air.

For the purposes of this specification, the term "aircraft" shall be construed to include but not be limited to an airplane, helicopter, balloon, spacecraft, satellite, missile, rocket or similar craft.

As used herein the term "and/or" means "and" or "or", or both.

As used herein "(s)" following a noun means the plural and/or singular forms of the noun.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the disaster management and communications industries.

The claims defining the invention are as follows:

1. An aerially distributable communications device for aerial deployment as a node of a communications network, the aerially distributable communications device including:
   a. a gyrochute including at least one or more set of blades, wherein the at least one or more set of blades includes an autorotation portion that is configured for inducing autorotation of the gyrochute, and wherein the pitch of the autorotation portion is configured with an angle of attack below the horizontal; and
   b. a communications module configured for wireless communication with external communication nodes, wherein the blades of the set of blades at least partly define an aerofoil shape along their length, and the pitch of the aerofoil shape is variable along the length of the blade.

2. The aerially distributable communications device as claimed in claim 1, wherein the gyrochute includes a body, the body including a hub and a hollow formation extending around the outside of the at least one or more set of blades.

3. The aerially distributable communications device as claimed in claim 2, wherein the blades are connected to each other at the hub.

4. The aerially distributable communications device as claimed in claim 2, wherein the hollow formation is a cylindrical formation, and the at least one or more set of blades are rigidly connected to the cylindrical formation.

5. The aerially distributable communications device as claimed in claim 4, wherein the cylindrical formation includes an annular flange extending outwardly from an upper edge of the cylindrical formation, and the vertices of the cylindrical formation curve into the annular flange at a curved upper surface.

6. The aerially distributable communications device as claimed in claim 5, wherein the annular flange includes a curved lower surface and the curved upper surface of the annular flange is configured for inducing a main column of airflow flowing upwardly through the cylindrical formation, to flow radially outwardly over the curved upper surface in use to induce lift force.

7. The aerially distributable communications device as claimed in claim 1, wherein at least one of the set of blades includes a planar extended trailing edge portion.

8. The aerially distributable communications device as claimed in claim 7, wherein the trailing edge extends substantially horizontally.

9. The aerially distributable communications device as claimed in claim 1, wherein the pitch of the autorotation portion is variable.

10. The aerially distributable communications device as claimed in claim 1, wherein the gyrochute includes a first blade set comprising a plurality of primarily lift force inducing blades attached at a hub, and a second blade set comprising a plurality of primarily rotation inducing blades.

11. The aerially distributable communications device as claimed in claim 1, wherein at least one or more blades of the at least one or more blade sets are foldable blades.

12. The aerially distributable communications device as claimed in claim 1, wherein at least one or more blades of the at least one or more blade sets are configured to be removably connectable to the body by a connector arrangement.

13. The aerially distributable communications device as claimed in claim 1, further including a controller, and wherein the controller includes at least one or more selected from:
   a. digital storage media for storing data and software instructions;
   b. a processor operatively connected to the digital storage media and configured for being directed by software instructions, wherein the digital storage media is configured with software instructions for directing operation of the processor;
   c. a transceiver; and
   d. at least one or more sensors.

14. The aerially distributable communications device as claimed in claim 1, further including a water purification device.

15. The aerially distributable communications device as claimed in claim 1, further including a dehumidifier and a storage tank for storing water generated by the dehumidifier.

16. The aerially distributable communications device as claimed in claim 1, wherein the aerially distributable communications device includes a power generation arrangement, a power storage arrangement and a power outlet.

17. The aerially distributable communications device as claimed in claim 1, wherein the aerially distributable communications device includes a heat shield for shielding one or more selected from the gyrochute and the communications module on re-entry into an atmosphere in use.

18. A communication network comprising:
one or more aerially distributed communication devices each including:
   a. a gyrochute including at least one or more set of blades, wherein the at least one or more set of blades includes an autorotation portion that is configured for inducing autorotation of the gyrochute, and wherein the pitch of the autorotation portion is configured with an angle of attack below the horizontal; and
   b. a communications module configured for wireless communication with external communication nodes,
wherein the blades of the set of blades at least partly define an aerofoil shape along their length, and the pitch of the aerofoil shape is variable along the length of the blade.

19. A method of deploying communications nodes, the method comprising:
   a. providing at least one or more aerially distributable communication devices each including:
      i. a gyrochute including at least one or more set of blades, wherein the at least one or more set of blades includes an autorotation portion that is configured for inducing autorotation of the gyrochute, and wherein the pitch of the autorotation portion is configured with an angle of attack below the horizontal; and
      ii. a communications module configured for wireless communication with external communication nodes,
   wherein the blades of the set of blades at least partly define an aerofoil shape along their length, and the pitch of the aerofoil shape is variable along the length of the blade; and
   b. deploying the at least one or more aerially distributable communication devices from an aircraft and/or spacecraft.

* * * * *

UNITED STATES PATENT AND TRADEMARK OFFICE
CERTIFICATE OF CORRECTION

| | |
|---|---|
| PATENT NO. | : 11,757,523 B2 |
| APPLICATION NO. | : 17/764085 |
| DATED | : September 12, 2023 |
| INVENTOR(S) | : Yen Yang Lim, Alexander Domineyk Benoit Le Poer Trench and Gavan Huang |

It is certified that error appears in the above-identified patent and that said Letters Patent is hereby corrected as shown below:

On the Title Page

(73) Assignee, should read:
WISE NETWORKING PTY LTD,
Ultimo (AU)

Signed and Sealed this
Third Day of September, 2024

Katherine Kelly Vidal
*Director of the United States Patent and Trademark Office*